US 9,058,246 B2

(12) United States Patent
Shida

(10) Patent No.: US 9,058,246 B2
(45) Date of Patent: Jun. 16, 2015

(54) VEHICLE CONTROL DEVICE

(75) Inventor: Mitsuhisa Shida, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/814,114

(22) PCT Filed: Aug. 8, 2011

(86) PCT No.: PCT/JP2011/068085
§ 371 (c)(1),
(2), (4) Date: Feb. 4, 2013

(87) PCT Pub. No.: WO2012/020736
PCT Pub. Date: Feb. 16, 2012

(65) Prior Publication Data
US 2013/0144465 A1    Jun. 6, 2013

(30) Foreign Application Priority Data

Aug. 11, 2010    (JP) ................. 2010-180452

(51) Int. Cl.
G05D 1/00 (2006.01)
G06F 17/00 (2006.01)
B60T 7/22 (2006.01)
B60W 30/16 (2012.01)
G08G 1/16 (2006.01)

(52) U.S. Cl.
CPC . *G06F 17/00* (2013.01); *B60T 7/22* (2013.01); *B60W 30/16* (2013.01); *B60W 2550/408* (2013.01); *B60W 2750/308* (2013.01); *G08G 1/163* (2013.01)
USPC .......................................... 701/1

(58) Field of Classification Search
CPC .................. B60W 30/16; B60W 2550/408
USPC .......................................... 701/1
See application file for complete search history.

(56) References Cited

U.S. PATENT DOCUMENTS

| 6,356,820 | B1 * | 3/2002 | Hashimoto et al. | 701/23 |
| 2003/0009275 | A1 * | 1/2003 | Koike | 701/93 |
| 2005/0096825 | A1 | 5/2005 | Lee | |
| 2007/0038772 | A1 | 2/2007 | Obata | |
| 2010/0256852 | A1 * | 10/2010 | Mudalige | 701/24 |

FOREIGN PATENT DOCUMENTS

| JP | A-11-72559 | 3/1999 |
| JP | A-2000-339600 | 12/2000 |
| JP | A-2004-034746 | 2/2004 |
| JP | A-2005-132338 | 5/2005 |
| JP | A-2007-233965 | 9/2007 |
| JP | A-2008-110620 | 5/2008 |

* cited by examiner

*Primary Examiner* — Muhammad Shafi
*Assistant Examiner* — Michael D Lang
(74) *Attorney, Agent, or Firm* — Oliff PLC

(57) ABSTRACT

A vehicle control device capable of more appropriately carrying out travel control of an own vehicle carried out while acquiring travel information of a leading vehicle by an inter-vehicle communication is provided. Provided is a vehicle control device for carrying out vehicle control of acquiring inter-vehicle communication information of a leading vehicle travelling in front of an own vehicle, and controlling a travel state of the own vehicle based on the acquired inter-vehicle communication information of the leading vehicle, wherein control of the inter-vehicle communication is changed according to a parameter at the time of the vehicle control.

1 Claim, 9 Drawing Sheets

VEHICLE CONTROL DEVICE

FIELD

The present invention relates to a vehicle control device.

BACKGROUND

In vehicles of recent years, a control device that assists the driving operation at the time of the travelling of the vehicle is being developed to enhance the easiness in driving at the time of the travelling of the vehicle, to reduce the load of the driving operation by a driver, and to enhance the safety at the time of the travelling of the vehicle.

For example, in a rear-end collision preventing device described in patent literature 1, it is provided to enable wireless communication between vehicles, where a leading vehicle transmits, by wireless communication, a status where sudden braking is anticipated, and an own vehicle that received information from the leading vehicle maintains a brake system in a brake activation waiting state. Thus, when a driver of the own vehicle performs a braking operation, the own vehicle immediately starts to brake, and thus the own vehicle can be prevented from making a rear-end collision with the leading vehicle even if the leading vehicle makes a sudden braking.

CITATION LIST

Patent Literature

Patent literature 1: Japanese Patent Application Laid-open No. 2005-132338

SUMMARY

Technical Problem

However, when transmitting and receiving travel information by wireless communication between the vehicles, the travel information of another vehicle, for example, the travel information of the leading vehicle may not be appropriately acquired depending on the communication state. If the travel information of the leading vehicle cannot be appropriately received, the mode of travel control needs to be switched according to the communication state such as switching the travel control of the own vehicle from the travel control carried out using the travel information of the leading vehicle to the travel control that does not use the travel information.

On the other hand, the degree of importance of the travel information may not be very high depending on the travel state of the own vehicle even if the travel control carried out using the travel information of the leading vehicle is being carried out. In such a case as well, the travel control is switched more than necessary if the mode of the travel control is switched as soon as the travel information is no longer appropriately received, and the control may become troublesome.

In light of the foregoing, it is an object of the present invention to provide a vehicle control device capable of more appropriately carrying out travel control of the own vehicle carried out while acquiring the travel information of the leading vehicle by inter-vehicle communication.

Solution to Problem

In order to solve the above mentioned problem and achieve the object, a vehicle control device according to the present invention for carrying out a vehicle control of acquiring inter-vehicle communication information of a leading vehicle travelling in front of an own vehicle and controlling a travel state of the own vehicle based on the acquired inter-vehicle communication information of the leading vehicle, wherein control of the inter-vehicle communication is changed according to a parameter at the time of the vehicle control.

Further, it is preferable that the parameter at the time of the vehicle control is an inter-vehicle time between the leading vehicle and the own vehicle, and a communication interruption determining time is changed when changing the control of the inter-vehicle communication.

Further, it is preferable that the communication interruption determining time is a time shorter than a time obtained by subtracting a delay time of a response with respect to a control signal at the time of the vehicle control from the inter-vehicle time.

Further, it is preferable that the inter-vehicle communication is stopped when an interruption time of the communication exceeds the communication interruption determining time when carrying out the inter-vehicle communication.

Advantageous Effects of Invention

A vehicle control device according to the present invention has an effect of being able to more appropriately carry out travel control of the own vehicle carried out while acquiring the travel information of the leading vehicle by inter-vehicle communication.

DESCRIPTION OF EMBODIMENTS

An embodiment of a vehicle control device according to the present invention will be hereinafter described in detail based on the drawings. It should be recognized that the present invention is not to be limited by such embodiment.

The configuring elements in the following embodiment include simple configuring elements that are replaceable by those skilled in the art or configuring elements that are substantially the same.

Embodiment

Figure 1:
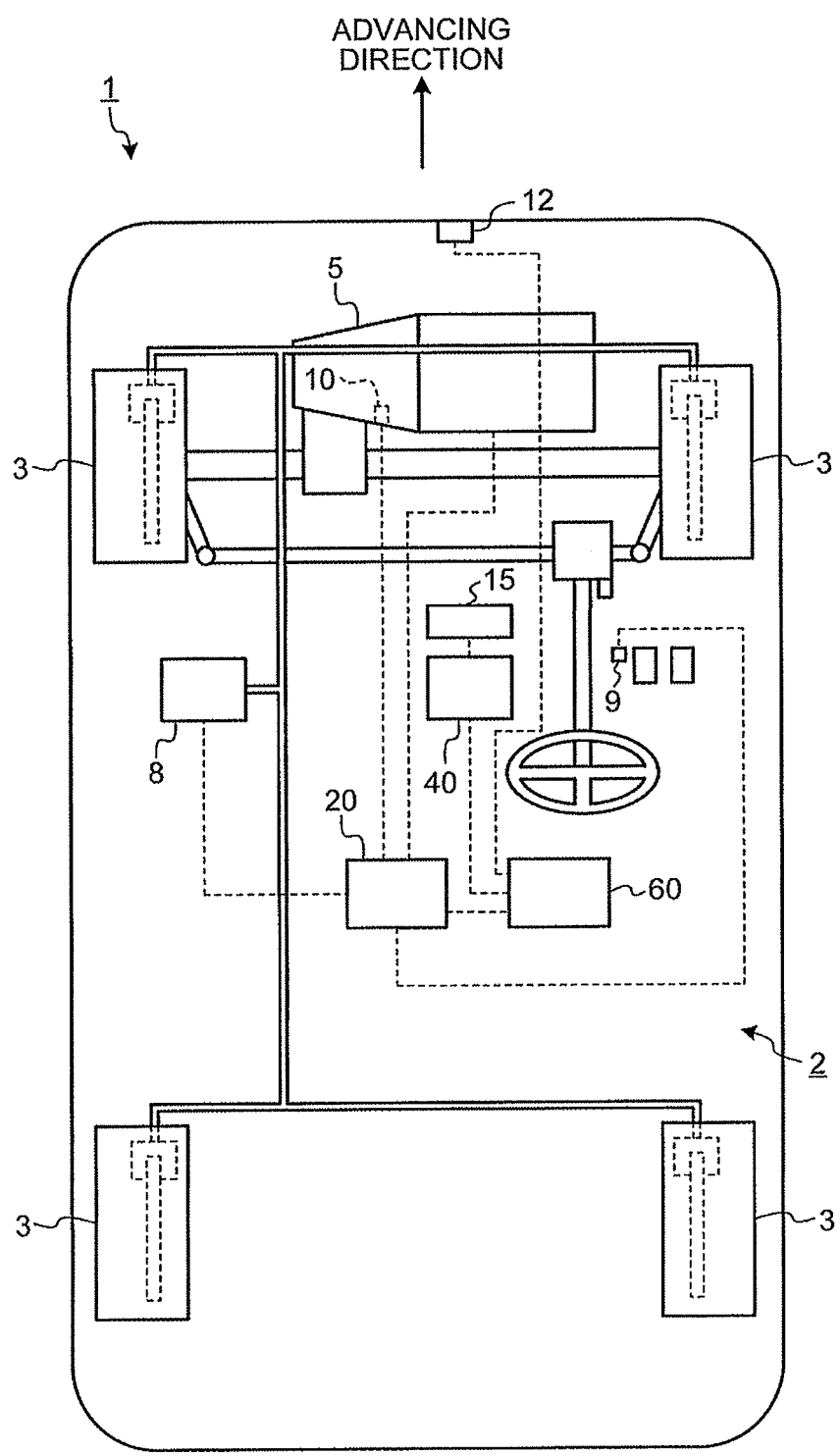
FIG. 1 is a schematic view of a vehicle including a vehicle control device according to an embodiment of the present invention.

FIG. 1 is a schematic view of a vehicle including a vehicle control device according to an embodiment of the present invention. A vehicle 1 including a vehicle control device 2 according to the embodiment has an engine 5, which is an internal combustion, mounted as a power source, and is able to travel when the power generated by the engine 5 is transmitted to a wheel 3 through a driving device such as an automatic transmission (not illustrated). The vehicle 1 also includes a brake device (not illustrated), which is a braking means that applies brake to the travelling vehicle 1 by applying brake to the wheel 3, and a brake hydraulic pressure control device 8 that controls the hydraulic pressure of when activating the brake device. The driving device includes a vehicle speed sensor 10, which is a vehicle speed detection means, for detecting the vehicle speed by detecting a rotation speed of when transmitting the power of the engine 5 to the wheel 3.

The vehicle 1 furthermore includes a radar 12, which is a forward status detection means, for detecting other vehicles travelling in front, obstacles positioned in the travelling direction, and the like; and an inter-vehicle communication device 15, which is an inter-vehicle communication means, enabling communication of information on a travel state, and the like with another vehicle. The radar 12 may take any form as long as it is a radar that can be mounted on the vehicle 1 such as a laser radar that uses laser for the detection wave, or a millimeter wave radar that uses millimeter wave. The inter-vehicle communication device 15 includes an antenna for transmitting and receiving electromagnetic waves, as well as devices necessary for carrying out the wireless communication such as a transmission device, a reception device, and the like of signals.

The engine 5, the brake hydraulic pressure control device 8, the vehicle speed sensor 10, the radar 12, and the inter-vehicle communication device 15 are mounted on the vehicle 1 and are connected to an ECU (Electronic Control Unit) for controlling each unit of the vehicle 1. The ECU includes a travel control ECU 20 that carries out travel control of the vehicle 1, a communication follow-up travel control ECU 40 that carries out communication follow-up travel control which is travel control of carrying out travelling that follows the leading vehicle while communicating with another vehicle, and an autonomous follow-up travel control ECU 60 that carries out autonomous follow-up travel control which is travel control of carrying out travelling that autonomously follows the leading vehicle without communicating with another vehicle.

Figure 2:
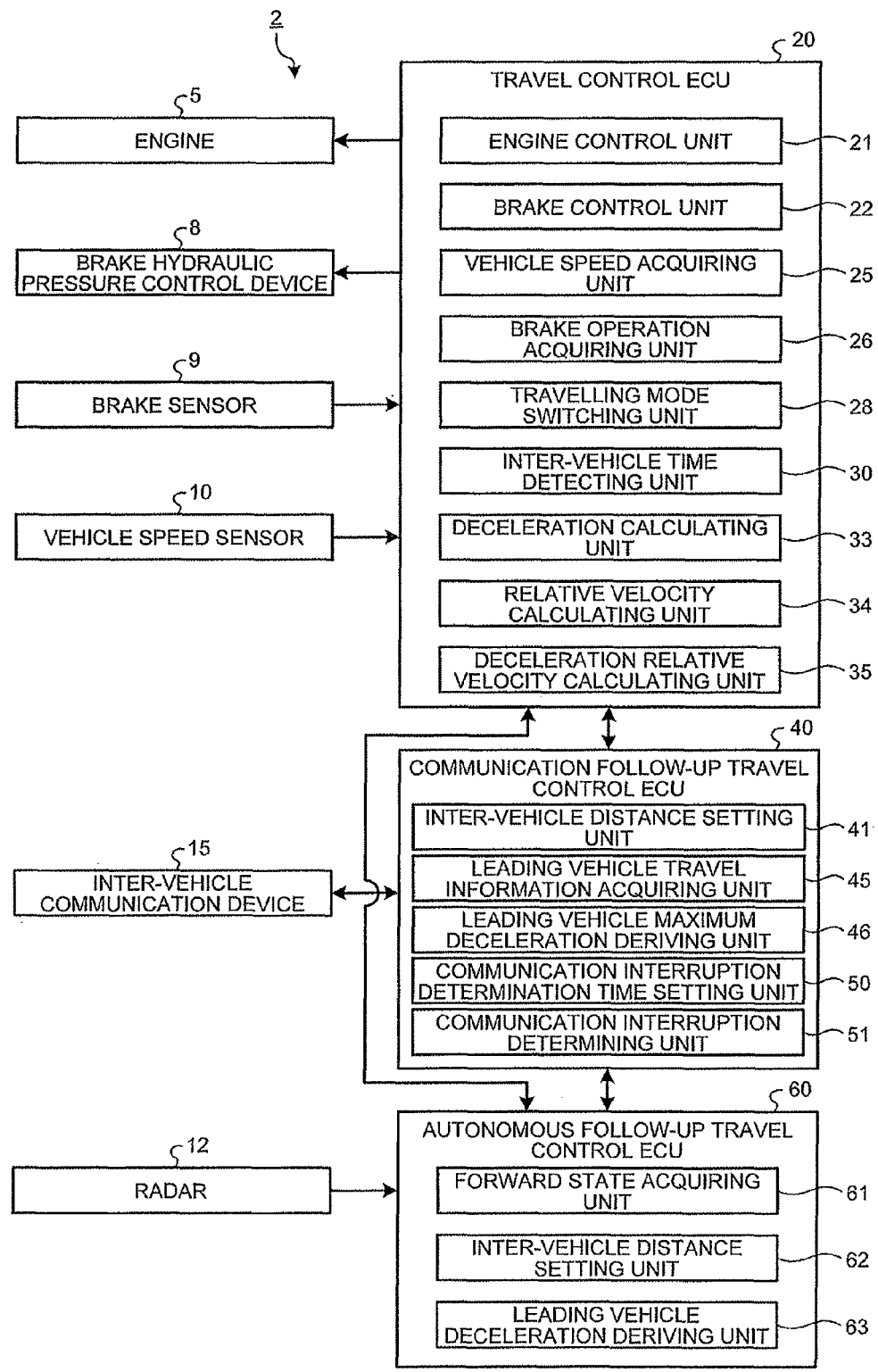
FIG. 2 is a configuration diagram of the main parts of the vehicle control device illustrated in FIG. 1.

FIG. 2 is a configuration diagram of the main parts of the vehicle control device illustrated in FIG. 1. Among the units connected to the ECU, the devices used in the travelling of the vehicle such as the engine 5, the brake hydraulic pressure control device 8, the vehicle speed sensor 10, and the like are connected to the travel control ECU 20, and a brake sensor 9 for detecting the operation amount of a brake pedal (not illustrated) operated by the driver when decelerating the vehicle 1 is connected to the travel control ECU 20. The travel control ECU 20 carries out the travel control of the vehicle 1 by activating the engine 5, the brake hydraulic pressure control device 8, and the like based on the detection results of the detection means such as the vehicle speed sensor 10 and the brake sensor 9.

The inter-vehicle communication device 15 used to communicate with another vehicle is connected to the communication follow-up travel control ECU 40, which communication follow-up travel control ECU 40 transmits a control signal to the travel control ECU 20 and carries out the travel control of the vehicle 1 while communicating the information on the travel state, and the like with another vehicle by means of the inter-vehicle communication device 15 thus carrying out communication follow-up travel control, which is vehicle control for controlling the travel state of the vehicle 1 based on the acquired inter-vehicle communication information of another vehicle. The radar 12 used as an inter-vehicle distance detection means for detecting the inter-vehicle distance between the own vehicle and the leading vehicle in the autonomous follow-up travel control by detecting another vehicle travelling in front, or the like is connected to the autonomous follow-up travel control ECU 60, which autonomous follow-up travel control ECU 60 transmits a control signal to the travel control ECU 20 while detecting the inter-vehicle distance between the own vehicle and the leading vehicle by means of the radar 12 and carries out the travel control of maintaining the inter-vehicle distance detected with the radar 12 at a target value, thus carrying out the autonomous follow-up travel control.

The travel control ECU 20, the communication follow-up travel control ECU 40, and the autonomous follow-up travel control ECU 60 are connected to each other to be able to exchange information and signals with each other. The hardware configuration of the travel control ECU 20, the communication follow-up travel control ECU 40, and the autonomous follow-up travel control ECU 60 is a known configuration including a processing unit with a CPU (Central Processing Unit), and the like, a storage unit such as a RAM (Random Access Memory), and the like, and hence the description thereof will be omitted.

Among such ECUs, the travel control ECU 20 includes an engine control unit 21 for carrying out operation control of the engine 5, a brake control unit 22 for controlling the brake hydraulic pressure control device 8 to control braking force, a vehicle speed acquiring unit 25 for acquiring a vehicle speed from the detection result of the vehicle speed sensor 10, a brake operation acquiring unit 26 for acquiring a state of operation of the brake pedal from the detection result of the brake sensor 9, a travelling mode switching unit 28 for switching the travelling mode at the time of the travelling of the vehicle 1 among the communication follow-up travel control, the autonomous follow-up travel control, as well as manual travel control, which is the travel control carried out by the driving operation of the driver without carrying out the above follow-up travel controls, an inter-vehicle time detecting unit 30, which is an inter-vehicle time detection means, for detecting an inter-vehicle time with the leading vehicle based on the detection result of the radar 12, a deceleration calculating unit 33 for calculating the deceleration of the own vehicle based on the deceleration of the leading vehicle, a relative velocity calculating unit 34 for calculating the relative velocity with the leading vehicle based on the detection result of the radar 12, and a deceleration relative velocity calculating unit 35 for calculating the relative velocity to be used when carrying out the deceleration control.

The communication follow-up travel control ECU 40 includes an inter-vehicle distance setting unit 41 for setting an inter-vehicle distance at the time of the communication follow-up travel control based on the inter-vehicle time set in advance for the time of the communication follow-up travel control, a leading vehicle travel information acquiring unit 45 for acquiring the travel information of the leading vehicle by the inter-vehicle communication performed by the inter-vehicle communication device 15, a leading vehicle maximum deceleration deriving unit 46 for deriving the maximum deceleration at the time of the deceleration of the leading vehicle, a communication interruption determining time setting unit 50 for setting a communication interruption determining time according to the parameter of the follow-up travel control, and a communication interruption determining unit 51 for determining whether or not the communication with the leading vehicle carried out by the inter-vehicle communication device 15 is interrupted.

The autonomous follow-up travel control ECU 60 includes a forward state acquiring unit 61 for acquiring a state in front of the vehicle 1 from the detection result of the radar 12, an inter-vehicle distance setting unit 62 for setting the inter-vehicle distance at the time of the autonomous follow-up travel control based on the inter-vehicle time set in advance for the autonomous follow-up travel control and the vehicle speed acquired by the vehicle speed acquiring unit 25, and a leading vehicle deceleration deriving unit 63 for deriving the deceleration at the time of the deceleration of the leading vehicle.

The vehicle control device 2 according to the embodiment has the configuration described above, and now the effects will be described below. At the time of normal travelling of the vehicle 1, the driver operates the acceleration pedal (not illustrated) and the brake pedal, so that the engine 5 and each actuator such the brake hydraulic pressure control device 8, and the like are activated and the vehicle 1 travels according to the driving operation of the driver. For example, the engine control unit 21 of the travel control ECU 20 controls the engine 5 when adjusting the power generated by the engine 5, and the brake control unit 22 of the travel control ECU 20 controls the brake hydraulic pressure control device 8 when generating the braking force to generate the braking force.

At the time of the travelling of the vehicle 1, the travel state of the vehicle 1 and the driving operation of the driver are detected by the sensors arranged in each unit of the vehicle 1 to be used for the travel control of the vehicle 1. For example, the detection result detected by the vehicle speed sensor 10 is acquired by the vehicle speed acquiring unit 25 of the travel control ECU 20, and is used when carrying out the travel control using the vehicle speed. Similarly, the detection result detected by the brake sensor 9 is acquired by the brake operation acquiring unit 26 of the travel control ECU 20 as an operation amount of the brake operation performed by the driver, so that the brake control unit 22 controls the brake hydraulic pressure control device 8 according to the acquired operation amount to generate the braking force.

The vehicle 1 is arranged so as to be able to perform the follow-up travel control of following another vehicle travelling in front of the relevant vehicle 1, as necessary, based on the intention of the driver such as operating an operation switch (not illustrated) for follow-up travelling, and the like. That is, it is provided so as to be able to carry out the follow-up travel control as travel control for assisting the driving operation performed by the driver. The follow-up travel control includes the communication follow-up travel control and the autonomous follow-up travel control, which are respectively used according to the state at the time of the travelling of the vehicle 1.

Figure 3:
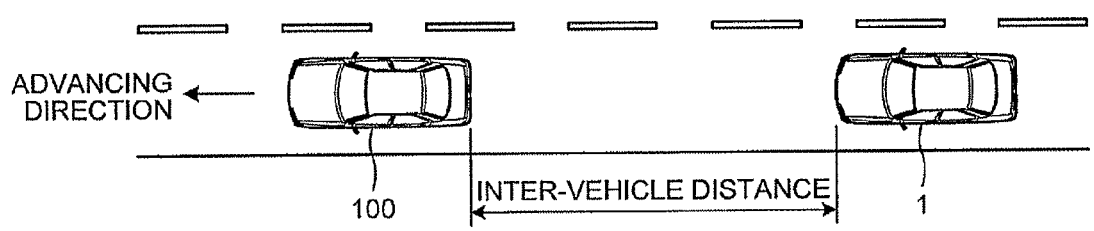
FIG. 3 is an explanatory diagram on follow-up travelling.

FIG. 3 is an explanatory diagram on follow-up travelling. First, the autonomous follow-up travel control will be described. When performing the autonomous follow-up travel control, the state in front of the vehicle 1 is detected by the radar 12, and the state in front of the vehicle 1 is acquired by the forward state acquiring unit 61 of the autonomous follow-up travel control ECU 60 based on the detection result of the radar 12. In the forward state acquiring unit 61, the presence or absence of a leading vehicle 100, which is another vehicle travelling in front of the vehicle 1, is detected, and the distance with respect to the leading vehicle 100 is acquired based on the detection result of the radar 12 if the leading vehicle 100 is present.

At the time of the autonomous follow-up travel control, the inter-vehicle distance setting unit 62 sets the inter-vehicle distance corresponding to the vehicle speed acquired by the vehicle speed acquiring unit 25 of the travel control ECU 20. When setting such inter-vehicle distance, the inter-vehicle distance setting unit 62 sets the inter-vehicle distance based on an inter-vehicle time for autonomous follow-up travelling that is set in advance as a time with the leading vehicle 100 suited when carrying out the autonomous follow-up travelling and stored in the storage unit, and the vehicle speed acquired by the vehicle speed acquiring unit 25 of the travel control ECU 20.

The autonomous follow-up travel control ECU 60 transmits a signal to the travel control ECU 20 to adjust the speed of the vehicle 1 such that the inter-vehicle distance with respect to the leading vehicle 100 acquired by the forward state acquiring unit 61 becomes the same extent as the inter-vehicle distance set in the inter-vehicle distance setting unit 62. The travel control ECU 20 that received the signal adjusts the driving force and the braking force with the engine control unit 21 and the brake control unit 22 to maintain the inter-vehicle distance with the leading vehicle 100 at a distance of the same extent as the inter-vehicle distance set in the inter-vehicle distance setting unit 62. The follow-up travelling of following the leading vehicle 100 is thereby carried out.

The communication follow-up travel control will now be described. The communication follow-up travel control is carried out when the other vehicle travelling around is a communication vehicle, which is a vehicle that can carry out communication of the travel information with each other. In other words, the communication follow-up travel control can be carried out when the leading vehicle 100 is a communication vehicle. When carrying out the communication follow-up travel control, the inter-vehicle communication is carried out with the leading vehicle 100 through the inter-vehicle communication device 15 to acquire the travel information of the leading vehicle 100.

In the acquisition of the travel information of the leading vehicle 100, the travel information transmitted from the leading vehicle 100 by the inter-vehicle communication carried out with the leading vehicle 100 by the inter-vehicle communication device 15 is acquired by the leading vehicle travel information acquiring unit 45 of the communication follow-up travel control ECU 40. This travel information includes information of a motion state of the communication vehicle, information of the driving operation of the driver, and positional information of the communication vehicle.

After acquiring the travel information of the leading vehicle 100, the inter-vehicle distance with the leading vehicle 100 is set in the inter-vehicle distance setting unit 41 according to the vehicle speed acquired by the vehicle speed acquiring unit 25, the vehicle speed of the leading vehicle 100, and the current driving operation of the driver of the leading vehicle 100. When setting the inter-vehicle distance at the time of the communication follow-up travel control, the inter-vehicle distance setting unit 41 sets the inter-vehicle distance based on the inter-vehicle time for communication follow-up travelling that is set in advance as a time with the leading vehicle 100 suited when carrying out the communication follow-up travelling and stored in the storage unit, the vehicle speed acquired by the vehicle speed acquiring unit 25, and the travel information of the leading vehicle 100 acquired by the leading vehicle travel information acquiring unit 45, similar to when setting the inter-vehicle distance at the time of the autonomous follow-up travel control. The inter-vehicle time for communication follow-up travelling is set to a time shorter than the inter-vehicle time for autonomous follow-up travelling. Thus, the inter-vehicle distance at the time of the communication follow-up travelling is set to a distance shorter than the inter-vehicle distance at the time of the autonomous follow-up travelling.

The communication follow-up travel control ECU 40 transmits a signal to the travel control ECU 20 to adjust the speed of the vehicle 1 such that the inter-vehicle distance with respect to the leading vehicle 100 becomes the same extent as the inter-vehicle distance set in the inter-vehicle distance setting unit 41 based on the positional information of the leading vehicle 100 acquired by the leading vehicle travel information acquiring unit 45. The travel control ECU 20 that received the signal adjusts the driving force and the braking force according to the signal to maintain the inter-vehicle distance with the leading vehicle 100 at a distance of the same extent as the inter-vehicle distance set in the inter-vehicle distance setting unit 41. The follow-up travelling of following the leading vehicle 100 is thereby carried out.

The follow-up travel control preferentially uses the communication follow-up travel control of the communication follow-up travel control and the autonomous follow-up travel control, and uses them depending on the communication state with the leading vehicle 100 in the communication follow-up travel control. Specifically, when carrying out the follow-up travel control, whether or not the communication with the leading vehicle 100 carried out by the inter-vehicle communication device 15 is interrupted is determined by the communication interruption determining unit 51 of the communication follow-up travel control ECU 40, and the determination result is transmitted to the travel control ECU 20 from the communication follow-up travel control ECU 40. The travel control ECU 20 that received the determination result switches the travelling mode with the travelling mode switching unit 28 according to the determination result.

The travelling mode switching unit 28 can switch the travelling mode among the communication follow-up travel control, the autonomous follow-up travel control, and the manual mode in which the driver makes all driving instructions by performing the driving operation without carrying out the follow-up travel control, and also performs switching using the determination made by the communication interruption determining unit 51 when switching the travelling mode.

In the travelling mode switching unit 28, the travelling mode is switched as described above, but if determination that communication is being carried out with the leading vehicle 100 is transmitted in a state the driver is instructing to carry out the follow-up travelling, the travelling mode is switched to the communication follow-up travel control. Furthermore, if determination that communication with the leading vehicle 100 is interrupted is transmitted in a state the driver is instructing to carry out the follow-up travelling, the travelling mode is switched to the autonomous follow-up travel control. That is, when the driver is instructing to carry out the follow-up travelling, the communication follow-up travel control is carried out if communication is possible with the leading vehicle 100, and the switch is made to the autonomous follow-up travel control if communication with the leading vehicle 100 is interrupted. When the driver is not instructing to carry out the follow-up travelling, the determination on whether or not communication is being carried out with the leading vehicle 100 is not made, and the travelling mode is switched to the manual mode.

When carrying out the follow-up travelling, the communication follow-up travel control and the autonomous follow-up travel control are switched according to the status of communication with the leading vehicle 100, and the travel control is carried out in accordance with the travel state of the leading vehicle 100. At the time of deceleration of the leading vehicle 100 while carrying out the communication follow-up travel control and the autonomous follow-up travel control, the deceleration of the same magnitude as the deceleration of the leading vehicle 100 is generated in the vehicle 1, that is, the own vehicle 1 before elapse of the inter-vehicle time with respect to the leading vehicle 100 in both follow-up travel controls.

At the time of the follow-up travel control, the own vehicle 1 is decelerated according to the deceleration of the leading vehicle 100 in such manner. The change in acceleration of both vehicles, the own vehicle 1 and the leading vehicle 100, of when the leading vehicle 100 decelerates will now be described.

Figure 4:
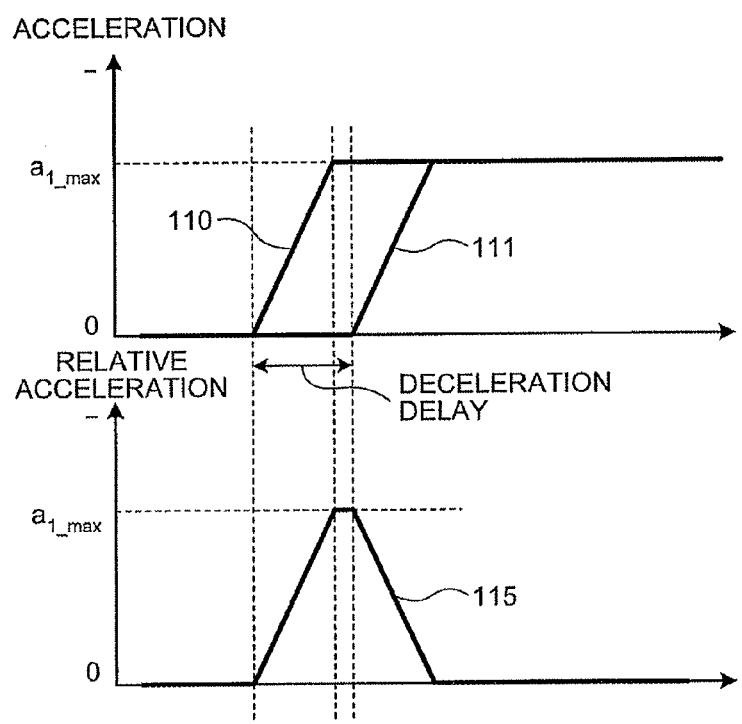
FIG. 4 is an explanatory diagram illustrating acceleration and relative acceleration of the leading vehicle and the own vehicle at the time of deceleration of the leading vehicle.

FIG. 4 is an explanatory diagram illustrating acceleration and relative acceleration of the leading vehicle and the own vehicle at the time of deceleration of the leading vehicle. When the own vehicle 1 and the leading vehicle 100 are travelling at the same speed, and the own vehicle 1 is travelling behind the leading vehicle 100 with the relative acceleration of both vehicles as zero, the acceleration in the decelerating direction becomes large if the leading vehicle 100 decelerates, and thus a leading vehicle acceleration 110, which is the acceleration of the leading vehicle 100, becomes large. Therefore, when the leading vehicle 100 decelerates in a state the speed of the own vehicle 1 does not change and the leading vehicle acceleration 110 becomes large, a difference in acceleration creates between the leading vehicle 100 and the own vehicle 1. A relative acceleration 115 of the own vehicle 1 and the leading vehicle 100 thus becomes large.

Normally, when decelerating the vehicle, the deceleration becomes larger with elapse of time from a state in which the deceleration is zero up to a predetermined deceleration such as a maximum deceleration corresponding to the driving status at the time, and the vehicle continues to decelerate at such deceleration after reaching the predetermined deceleration. Thus, the leading vehicle acceleration 110 reaches a constant state at the maximum deceleration $a_{1\_max}$, and the leading vehicle 100 continues to decelerate at such maximum deceleration When the leading vehicle acceleration 110 becomes constant at the maximum deceleration $a_{1\_max}$, the relative acceleration 115 also becomes constant.

When the own vehicle 1 starts to decelerate thereafter, an own vehicle acceleration 111, which is the acceleration of the own vehicle 1, becomes larger. Thus, when the own vehicle acceleration 111 becomes large with the leading vehicle acceleration 110 constant, the difference in acceleration between the own vehicle 1 and the leading vehicle 100 starts to become small, and hence the relative acceleration 115 that is in a constant state starts to become small. When the own vehicle acceleration 111 further becomes larger and the own vehicle acceleration 111 becomes the same magnitude as the leading vehicle acceleration 110, the relative acceleration 115 becomes zero.

At the time of the deceleration of the leading vehicle 100, the acceleration of the own vehicle 1 and the leading vehicle 100 changes in such manner. Describing the inter-vehicle distance at the time of the deceleration of the leading vehicle 100 based on the change in acceleration, when the leading vehicle 100 decelerates, the own vehicle 1 may decelerate with a deceleration delay with respect to the deceleration of the leading vehicle 100. The relative acceleration 115 thus becomes large, but the relative velocity also changes if the relative acceleration 115 becomes large. That is, in a state the own vehicle 1 has not started to decelerate, the speed of the leading vehicle 100 lowers with respect to the speed of the own vehicle 1 in which the vehicle speed is constant, and thus the relative velocity changes in the increasing direction. The inter-vehicle distance between the own vehicle 1 and the leading vehicle 100 thus becomes smaller with elapse of time.

The change in a direction the relative velocity increases continues until the deceleration of the own vehicle 1 becomes the same magnitude as the deceleration of the leading vehicle 100 even if the own vehicle 1 starts to decelerate. Therefore, after the deceleration of the leading vehicle 100, the relative velocity continues to increase until the deceleration of the own vehicle 1 reaches the same magnitude as the deceleration of the leading vehicle 100, and the relative velocity becomes constant after the deceleration of the own vehicle 1 reaches the same magnitude as the deceleration of the leading vehicle 100. Although the relative velocity becomes constant when the deceleration of the own vehicle 1 and the leading vehicle 100 becomes the same magnitude, as described above, the inter-vehicle distance between the vehicles continues to become smaller even if the deceleration is the same magnitude since the speed difference continues to exist.

Figure 5:
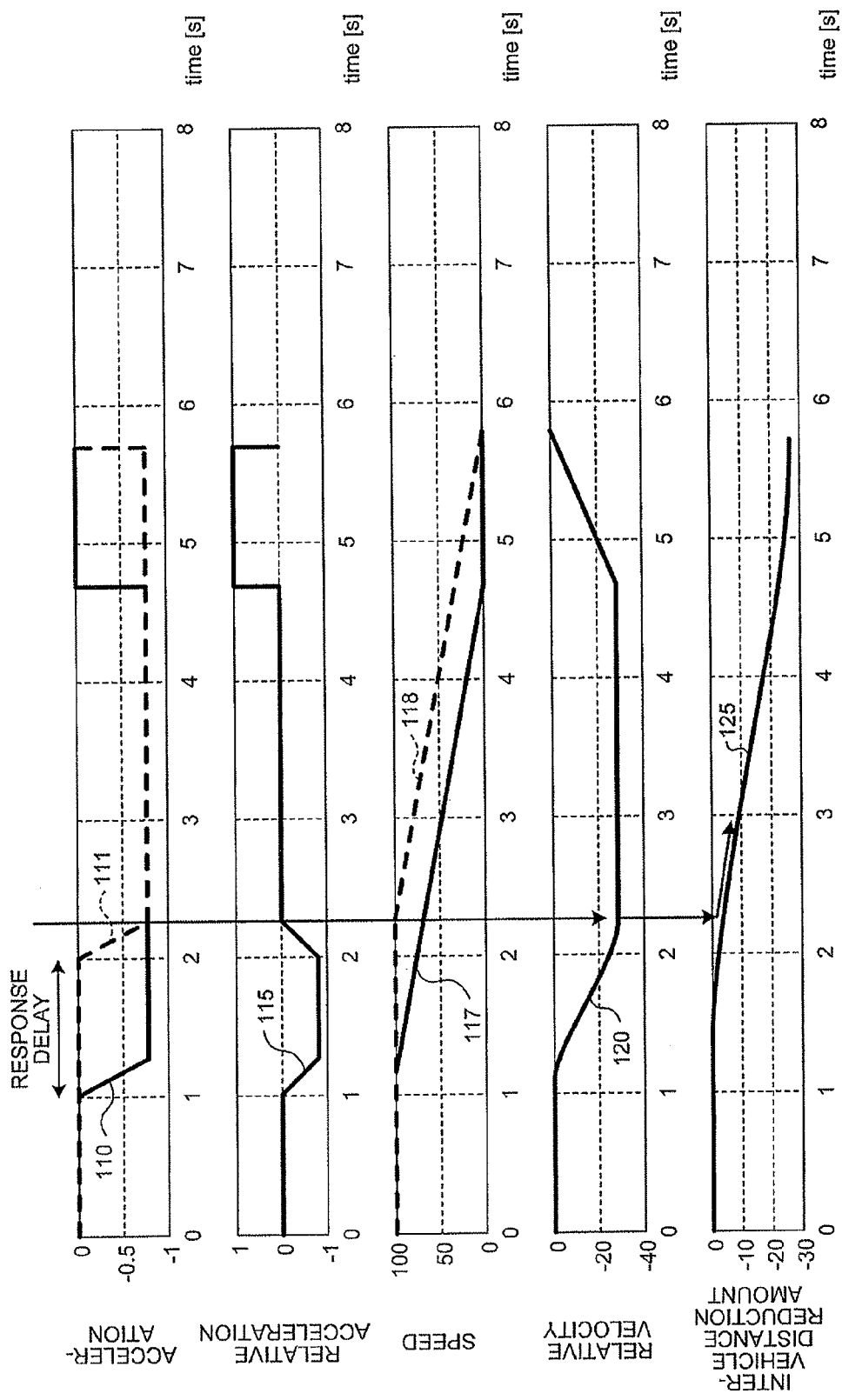
FIG. 5 is an explanatory diagram for when the own vehicle decelerates with a delay after the start of deceleration of the leading vehicle.

The change in the inter-vehicle distance at the time of deceleration of the leading vehicle 100 and the own vehicle 1 will now be described. FIG. 5 is an explanatory diagram for when the own vehicle decelerates with a delay after the leading vehicle starts to decelerate. FIG. 5 is an explanatory diagram for when the vehicle speed before the deceleration is $V_0$=100 km/h, the deceleration is $a_1$=0.8 G, and the response delay of the own vehicle 1 with respect to the deceleration of the leading vehicle 100 is dt=1 s. When the leading vehicle 100 starts to decelerate and the leading vehicle acceleration 110 becomes large in the decelerating direction while the own vehicle 1 is travelling at substantially the same vehicle speed with a predetermined inter-vehicle distance behind the leading vehicle 100, the relative acceleration 115 of the leading vehicle 100 with respect to the own vehicle 1 becomes large in a direction of decelerating with respect to the own vehicle 1. In this example, a case in which the deceleration is 0.8 G will be described, and thus after the leading vehicle acceleration 110 becomes large and reaches 0.8 G, the leading vehicle 100 continues to decelerate at the deceleration of 0.8 G thereafter. Thus, the relative acceleration 115 is constant for a predetermined period after the leading vehicle acceleration 110 reaches 0.8 G.

When the leading vehicle 100 starts to decelerate and generates deceleration, a leading vehicle speed 117 lowers with elapse of time. If, however, the own vehicle 1 is not decelerating, a relative velocity 120 of the own vehicle 1 and the leading vehicle 100 becomes large in the direction the speed of the leading vehicle 100 decelerates with respect to the speed of the own vehicle 1. A inter-vehicle distance 125 of the own vehicle 1 and the leading vehicle 100 becomes smaller with elapse of time.

Thus, the inter-vehicle distance 125 of the leading vehicle 100 and the own vehicle 1 becomes small when the leading vehicle 100 decelerates, but if the own vehicle 1 starts to decelerate after elapse of the response delay time dt, the own vehicle acceleration 111 also increases in the decelerating direction similar to the leading vehicle acceleration 110. The difference between the leading vehicle acceleration 110 and the own vehicle acceleration 111 thus becomes small, and hence the relative acceleration 115 of the leading vehicle 100 that is large in the direction of decelerating with respect to the own vehicle 1 becomes small. Furthermore, in this example, after the own vehicle acceleration 111 becomes large to 0.8 G, similar to the leading vehicle acceleration 110, the own vehicle 1 continues to decelerate at the deceleration of 0.8 G thereafter, and thus the own vehicle acceleration 111 becomes constant at 0.8 G after the own vehicle acceleration 111 reaches 0.8 G. In this case, there is no difference between the own vehicle acceleration 111 and the leading vehicle acceleration 110, and hence the relative acceleration 115 becomes zero.

When the own vehicle 1 starts to decelerate, the change in the relative velocity 120 becomes gradual since an own vehicle speed 118 lowers, where the relative velocity 120 becomes a constant magnitude when the own vehicle acceleration 111 becomes constant. Even if the leading vehicle acceleration 110 and the own vehicle acceleration 111 both have the same magnitude of 0.8 G and the relative acceleration 115 becomes zero, the relative velocity 120 is maintained at the constant magnitude while the leading vehicle speed 117 and the own vehicle speed 18 both lower by the response delay in the deceleration of the own vehicle 1 with respect to the deceleration of the leading vehicle 100. Thus, the inter-vehicle distance 125 becomes smaller with elapse of time.

When the leading vehicle 100 and the own vehicle 1 both continue to decelerate at the deceleration of the same magnitude in this state, the leading vehicle 100 that started to decelerate first stops first, and thereafter, the own vehicle 1 stops. When the vehicle speed before the deceleration is $V_0$=100 km/h, the deceleration is $a_1$=0.8 G, and the response delay of the own vehicle 1 with respect to the deceleration of the leading vehicle 100 is dt=1 s, if the leading vehicle 100 and the own vehicle 1 both continue to decelerate until coming to a stop, the closing inter-vehicle distance 125 becomes about 27.7 m. This distance is a value obtained by multiplying the response delay dt=1 s to the vehicle speed $V_0$=100 km/h before the deceleration.

Figure 6:
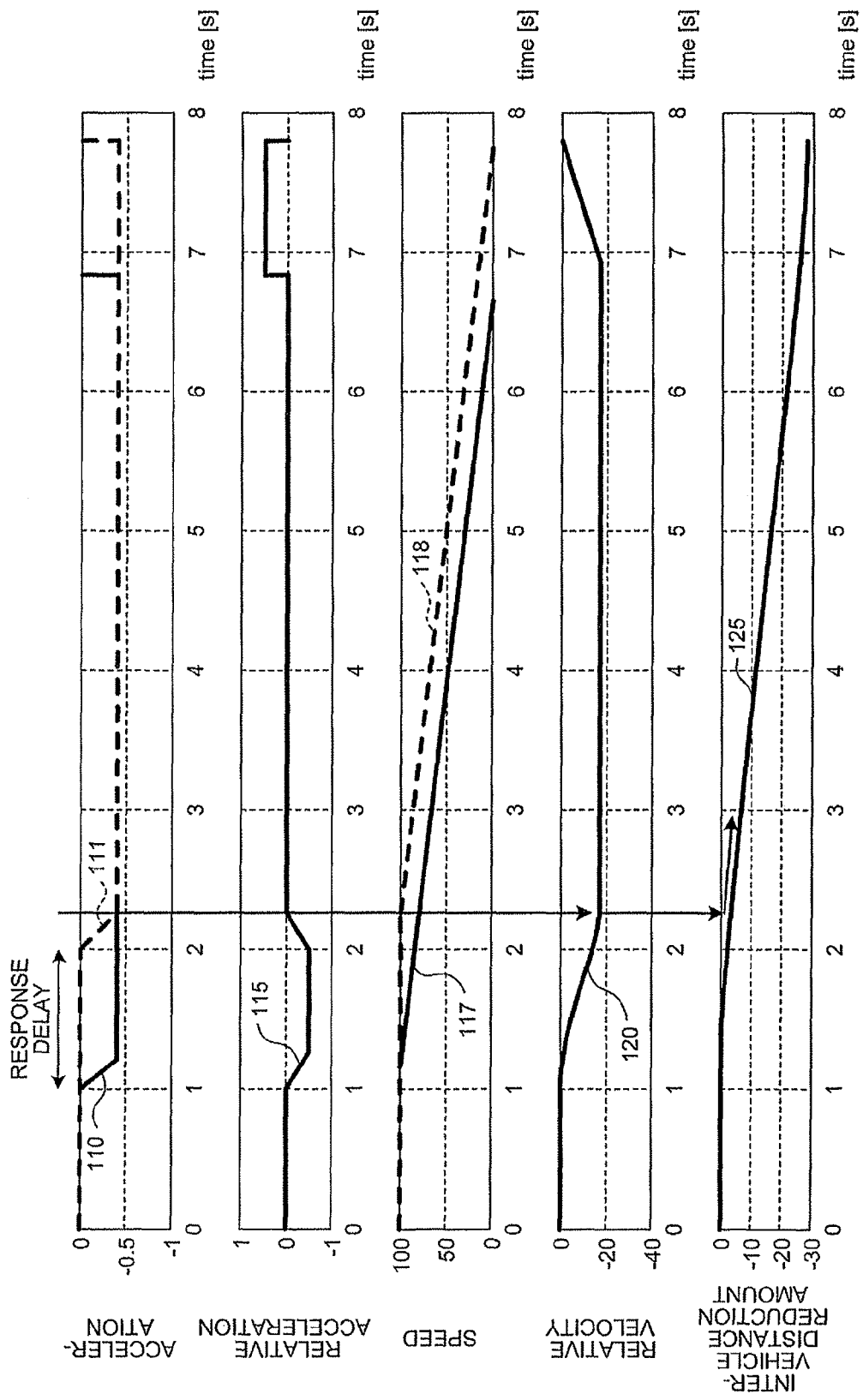
FIG. 6 is an explanatory diagram for when decelerating at a small deceleration with respect to the deceleration described in FIG. 5.

FIG. 6 is an explanatory diagram for when decelerating at a small deceleration with respect to the deceleration described in FIG. 5. Similar to the time of deceleration described using FIG. 5, FIG. 6 is an explanatory diagram for when the vehicle speed before the deceleration is $V_0$=100 km/h and the response delay of the own vehicle 1 with respect to the deceleration of the leading vehicle 100 is dt=1 s, but decelerating at deceleration $a_1$=0.4 G. Thus, even when decelerating at the deceleration of 0.4 G, if the leading vehicle 100 decelerates, the deceleration of the leading vehicle 100 becomes large until the leading vehicle acceleration 110 becomes 0.4 G, and the leading vehicle continues to decelerate at the deceleration of 0.4 G after the leading vehicle acceleration 110 reaches 0.4 G. Furthermore, when the leading vehicle 100 decelerates and the own vehicle 1 is in a state before the deceleration, the relative acceleration 115 becomes larger as the leading vehicle acceleration 110 becomes larger, and the deceleration is maintained for a predetermined period at a magnitude smaller than in the case of 0.8 G after the leading vehicle acceleration 110 reaches 0.4 G.

Therefore, when the leading vehicle 100 decelerates at the deceleration of 0.4 G, the leading vehicle speed 117 lowers in a gradual slope than when the deceleration is 0.8 G. Thus, if the own vehicle 1 is not decelerating, the relative velocity 120 of the own vehicle 1 and the leading vehicle 100 becomes larger in a gradual slope than when the deceleration is 0.8 G. Thus, the inter-vehicle distance 125 of the own vehicle 1 and the leading vehicle 100 becomes smaller in a gradual slope than when the deceleration is 0.8 G with elapse of time.

When the own vehicle 1 starts to decelerate after elapse of the response delay time dt after the leading vehicle 100 starts to decelerate, the own vehicle acceleration 111 also becomes large up to 0.4 G, similar to the leading vehicle acceleration 110, and the own vehicle acceleration 111 becomes constant at 0.4 G after the own vehicle acceleration 111 reaches 0.4 G. The relative acceleration 115 thus becomes zero.

When the own vehicle 1 starts to decelerate and the own vehicle acceleration 111 becomes constant, the relative velocity 120 also becomes a constant magnitude, similar to when the deceleration is 0.8 G. Similar to the case of decelerating at the deceleration of 0.8 G, even when decelerating at the deceleration of 0.4 G, the relative velocity 120 is maintained at a constant magnitude by the response delay of the deceleration of the own vehicle 1 with respect to the deceleration of the leading vehicle 100 even when the relative acceleration 115 becomes zero, and the inter-vehicle distance 125 becomes smaller with elapse of time.

When the leading vehicle 100 and the own vehicle 1 both continue to decelerate until coming to a stop in this state, the closing inter-vehicle distance 125 becomes about 27.7 m, similar to when the deceleration is 0.8 G. That is, when the initial speed of the leading vehicle 100 and the own vehicle 1 is the same vehicle speed and the deceleration at the time of deceleration is the same magnitude, the closing inter-vehicle distance 125 becomes a distance corresponding to the response delay regardless of the magnitude of the deceleration.

Regarding the inter-vehicle distance 125 at the time of deceleration, the closing distance becomes the same distance regardless of the magnitude of the deceleration as long as the initial speed and the deceleration of the leading vehicle 100 and the own vehicle 1 are the same magnitude, but the initial speed of the leading vehicle 100 and the own vehicle 1 influences the closing inter-vehicle distance 125 at the time of deceleration. A case in which the initial speed is different will now be described.

Figure 7:
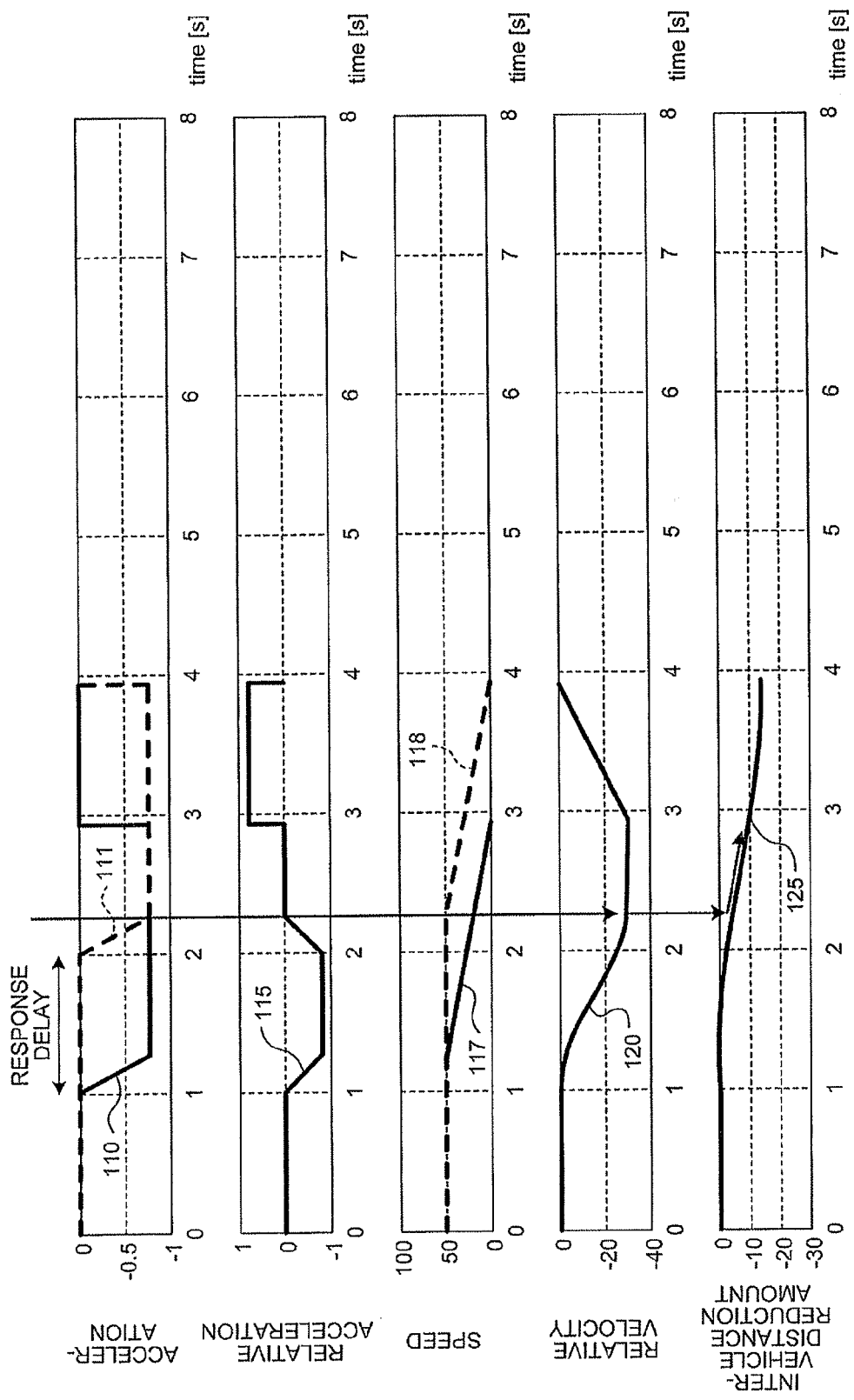
FIG. 7 is an explanatory diagram for when the initial speed is slow with respect to the deceleration described in FIG. 5.

FIG. 7 is an explanatory diagram for when the initial speed is slow with respect to the deceleration described in FIG. 5. Similar to the time of deceleration described using FIG. 5, FIG. 7 is an explanatory diagram for when the deceleration at the time of deceleration is $a_1$ 0.8 G and the response delay of the own vehicle 1 with respect to the deceleration of the leading vehicle 100 is dt=1 s, but the vehicle speed before the deceleration is $V_0$=50 km/h.

Therefore, when decelerating at the deceleration of 0.8 G even if the vehicle speed before the deceleration is slow, the leading vehicle acceleration 110 and the own vehicle acceleration 111 change with a slope similar to the case of when the vehicle speed before the deceleration is 100 km/h, and the relative acceleration 115 also changes similar to when the vehicle speed before the deceleration is 100 km/h. Thus, the leading vehicle speed 117 and the own vehicle speed 118 change similar to when the vehicle speed before the deceleration is 100 km/h, and hence the relative velocity 120 and the inter-vehicle distance 125 also change similar to when the vehicle speed before the deceleration is 100 km/h.

However, when the speed before the deceleration is 50 km/h, the closing inter-vehicle distance 125 becomes short since the distance from when the vehicle starts to decelerate until coming to a stop is short. That is, when the own vehicle 1 decelerates with a response delay after the leading vehicle 100 starts decelerate, the degree of change of the inter-vehicle distance 125 is no different from when the speed before the deceleration is 100 km/h, but the time from when the vehicle starts to decelerate until coming to a stop become short since the initial speed is slow when the speed before the deceleration is 50 km/h. The closing inter-vehicle distance 125 is thus short at the time of deceleration, and specifically, the closing inter-vehicle distance 125 becomes about 13.9 m, which is obtained by multiplying the response delay dt=1 s to the vehicle speed $V_0$=50 km/h before the deceleration.

The closing inter-vehicle distance 125 of when the own vehicle 1 decelerates at the same deceleration as the leading vehicle 100 is obtained by response delay time×initial speed regardless of the deceleration at the time of the deceleration. Thus, the closing inter-vehicle distance 125 becomes smaller as the response delay time becomes shorter regardless of the deceleration, and the inter-vehicle distance 125 after the deceleration becomes a distance indicated with the inter-vehicle time same as the inter-vehicle time before the deceleration if the response delay time is 0 s, that is, the deceleration exactly the same as the leading vehicle 100 can be realized.

The closing inter-vehicle distance 125 of when the own vehicle 1 decelerates by the deceleration of the leading vehicle 100 when the own vehicle 1 is travelling behind the leading vehicle 100 is greatly influenced by the response delay time as described above. The deceleration state in which the possibility of rear-end collision can be reduced when the leading vehicle 100 and the own vehicle 1 decelerate will now be described.

Figure 8:
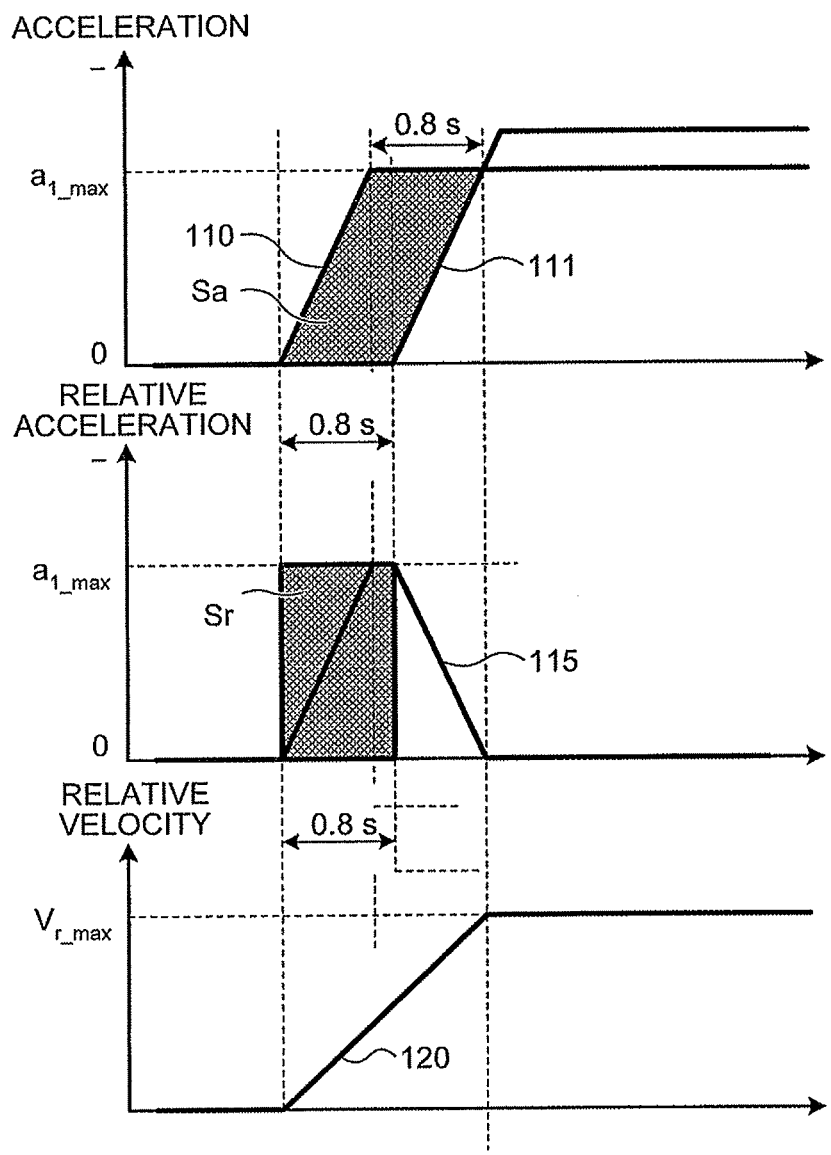
FIG. 8 is an explanatory diagram illustrating a relationship of the acceleration, the relative acceleration, and the relative velocity of the own vehicle and the leading vehicle at the time of deceleration.

FIG. 8 is an explanatory diagram illustrating a relationship of the acceleration, the relative acceleration, and the relative velocity of the own vehicle and the leading vehicle at the time of deceleration. Describing a complicating event at the time of deceleration simply and in an abstract manner, when the leading vehicle 100 and the own vehicle 1 decelerate, the own vehicle 1 decelerates at the deceleration of greater than or equal to the deceleration of the leading vehicle 100 in response to the reaction time the same as the inter-vehicle time after the deceleration of the leading vehicle 100, thus reducing the possibility of rear-end collision. For example, when the inter-vehicle time is 0.8 s, after the leading vehicle 100 starts to decelerate, the own vehicle responds at 0.8 s and then starts to decelerate, and decelerates at the deceleration of greater than or equal to the deceleration of the leading vehicle 100, so that the own vehicle 1 can reduce the possibility of rear-end collision with the leading vehicle 100.

That is, if jerk, which is the degree of change of the deceleration with respect to the elapsed time, is the same in the leading vehicle 100 and the own vehicle 1, the possibility of rear-end collision can be reduced if the relationship of the reaction time $t_{delay}$, which is the response delay time of the own vehicle 1 with respect to the braking of the leading vehicle 100, and the set inter-vehicle time τ satisfies ($t_{delay} \leq \tau$) In other words, the possibility of rear-end collision can be reduced by having the relative velocity generated by the response delay to a certain value or smaller.

A case of taking into consideration the reduction in the possibility of rear-end collision at the time of deceleration from the standpoint of relative velocity will now be described. First, if the jerk of the deceleration is the same in the own vehicle 1 and the leading vehicle 100, the leading vehicle acceleration 110 indicating the deceleration at the time of the deceleration of the leading vehicle 100 and the own vehicle acceleration 111 indicating the deceleration at the time of the deceleration of the own vehicle 1 have the same slope with respect to the elapsed time.

Therefore, when the leading vehicle acceleration 110 and the own vehicle acceleration 111 have the same jerk and the maximum value of the own vehicle acceleration 111 is greater than the leading vehicle maximum deceleration $a_{1\_max}$, which is the maximum value of the leading vehicle acceleration 110, the total amount of difference in acceleration caused by the response delay time when the own vehicle acceleration 111 is generated with a delay by the reaction time t with respect to the leading vehicle acceleration 110 can be indicated with an area $S_a$ of a parallelogram surrounded by the slope portions of the leading vehicle acceleration 110 and the own vehicle acceleration 111, the leading vehicle maximum deceleration $a_{1\_max}$ and the minimum value (0) of the deceleration.

Indicating the relative acceleration with the total amount of difference in acceleration (deceleration), the maximum value of the relative acceleration becomes the leading vehicle maximum deceleration $a_{1\_max}$ if the leading vehicle 100 started to decelerate and the own vehicle 1 has not started to decelerate due to response delay. If the response delay time of the own vehicle 1 generates at the time of the deceleration of the leading vehicle 100, the leading vehicle maximum deceleration $a_{1\_max}$ generates as the relative acceleration during the response delay time, that is, during the reaction time $t_{delay}$. Thus, the total amount of relative acceleration caused by the response delay time becomes a value obtained by multiplying the reaction time $t_{delay}$ to the leading vehicle maximum deceleration $a_{1\_max}$, and can be indicated with an area $S_r$ of a portion surrounded by the leading vehicle maximum deceleration $a_{1\_max}$ and the reaction time $t_{delay}$.

Thus, the total amount of acceleration and relative acceleration of when the response delay is generated can be indicated with an area $S_a$ of a parallelogram of the acceleration or an area $S_r$ of the relative acceleration, which areas can be calculated by multiplying the leading vehicle maximum deceleration $a_{1\_max}$ and the reaction time $t_{delay}$. To reduce the possibility of rear-end collision when the own vehicle 1 decelerates after the leading vehicle 100 starts to decelerate, the relationship of the reaction time $t_{delay}$, the set inter-vehicle time τ merely needs to satisfy ($t_{delay} \le \tau$). This can be expressed with the following equation (1).

$S_r$(relative acceleration area)=$S_a$(area of parallelogram)≤τ(set inter-vehicle time)·$a_{1\_max}$(leading vehicle maximum deceleration)  (1)

The relative acceleration area $S_r$ is the total amount of acceleration during the reaction time $t_{delay}$, and thus represents the relative velocity $V_r$ of the own vehicle 1 and the leading vehicle 100 after elapse of the reaction time $t_{delay}$. If the jerk of the deceleration of the leading vehicle 100 and the own vehicle 1 is the same, the relationship {$t_{delay}$ (reaction time)≤τ(set inter-vehicle time)} is to be satisfied to reduce the possibility of rear-end collision. Thus, assuming the maximum value of the relative velocity at which a distance immediately before the own vehicle 1 makes a rear-end collision with the leading vehicle 100 is realized at the end of deceleration of the leading vehicle 100 and the own vehicle 1 is $V_{r\_max}$, the maximum value $V_{r\_max}$ of the relative velocity becomes a value obtained by multiplying the set inter-vehicle time τ and the leading vehicle maximum deceleration $a_{1\_max}$. The possibility of rear-end collision thus can be reduced by having the relative velocity $V_r$ generated by the response delay of the own vehicle 1 to be smaller than or equal to the maximum value $V_{r\_max}$ of the relative velocity expressed in the following equation (2).

$V_r$(relative velocity)≤$V_{r\_max}$=τ(set inter-vehicle time)·$a_{1\_max}$(leading vehicle maximum deceleration)  (2)

In equation (2), it is the condition of reducing the possibility of rear-end collision including not only at the rise of braking but also a braking steady region. Thus, even if the rise of braking of the own vehicle 1 is delayed when the leading vehicle 100 is decelerated, the possibility of rear-end collision with the leading vehicle 100 can be reduced by applying a brake that ultimately satisfies equation (2). That is, even after the rise of braking, appropriate feedback control such as detecting the relative velocity with the leading vehicle 100 using the radar 12 is carried out, and the braking that ultimately satisfies equation (2) is performed to ensure the time for carrying out the control to reduce the possibility of rear-end collision.

Figure 9:
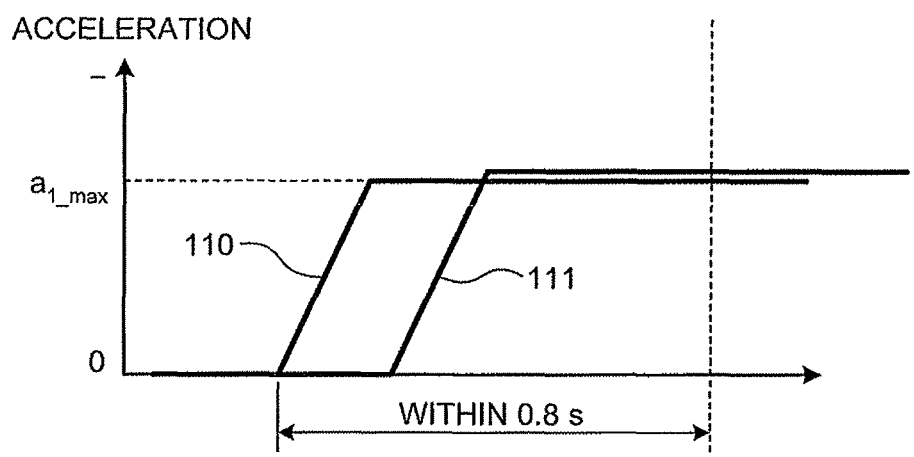
FIG. 9 is an explanatory diagram of acceleration of the leading vehicle and the own vehicle at the time of deceleration in the follow-up travel control.

FIG. 9 is an explanatory diagram of the acceleration of the leading vehicle and the own vehicle at the time of deceleration in the follow-up travel control. When decelerating the own vehicle 1 after the leading vehicle 100 starts to decelerate, the response delay of the own vehicle 1 is greatly involved, as described above, and hence the vehicle needs to travel in view of the response delay of the own vehicle 1 upon reducing the possibility of rear-end collision when travelling behind the leading vehicle 100. A case of setting the inter-vehicle time in view of the response delay at the time of deceleration will now be described. For example, when the leading vehicle 100 makes a sudden brake at the time of follow-up travel control in the inter-vehicle time of 0.8 s, deceleration can be carried out at substantially the same timing as the deceleration of the leading vehicle 100 since the response delay is about the communication delay (0.1 s) in the communication follow-up travel control. Therefore, in the communication follow-up travel control, braking can be started at sufficient rapidness when carrying out the follow-up travelling in the inter-vehicle time of 0.8 s.

When carrying out the autonomous follow-up travel control due to communication interruption at the time of the communication follow-up travelling, the possibility of rear-end collision with the leading vehicle 100 can be reduced by decelerating at the deceleration of greater than or equal to the deceleration of the leading vehicle 100 within 0.8 s, which is the set inter-vehicle time. At the time of the autonomous follow-up travel control, the possibility of rear-end collision can be reduced by estimating the deceleration of the leading vehicle 100 based on the detection result of the radar 12, and generating the estimated deceleration within 0.8 s.

The initial relative velocity is zero at the time of the follow-up travelling in the steady speed, but the initial relative velocity generates in the case of catching-up, cutting-in, and the like. For example, if the vehicle speed of the leading vehicle 100 is 80 km/h at the time point the leading vehicle 100 starts to decelerate, and the vehicle speed of the own vehicle 1 at the relevant time point is 100 km/h, the initial relative velocity becomes 20 km/h. Describing control of reducing the possibility of rear-end collision even when the leading vehicle 100 suddenly decelerates when there is an initial relative velocity, an equivalent reaction time in which the sum of the relative velocity by the response delay generated between the vehicles and the initial relative velocity becomes equal to the relative velocity margin between the vehicles is defined. When decelerating the own vehicle 1, the deceleration is controlled such that the equivalent reaction time does not exceed the set inter-vehicle time.

Figure 10:
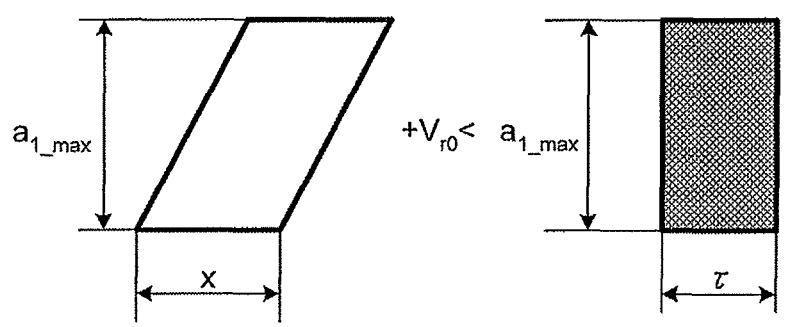
FIG. 10 is an explanatory diagram for an equivalent reaction time.

FIG. 10 is an explanatory diagram of the equivalent reaction time. The equivalent reaction time will be described. The equivalent reaction time has the same area as the relative acceleration area $S_r$ (see FIG. 8) when a value corresponding to the initial relative velocity $V_{r0}$ is added, and the size of the base of the parallelogram in which the height is the leading vehicle maximum deceleration $a_{1\_max}$ becomes the equivalent reaction time x. The relative acceleration area $S_r$ is a value obtained by multiplying the leading vehicle maximum deceleration $a_{1\_max}$ and the set inter-vehicle time τ, and can be expressed with the following equation (3).

$$a_{1\_max} \cdot x + V_{r0} = a_{1\_max} \cdot \tau \quad (3)$$

This equation (3) is modified to an equation for obtaining the equivalent reaction time x. Equation (4) is obtained.

$$x = \tau - (V_{r0}/a_{1\_max}) \quad (4)$$

As apparent from equation (4), the possibility of rear-end collision with the leading vehicle 100 can be reduced even if the initial relative velocity $V_{r0}$ is generated at the time of deceleration of the leading vehicle 100 by causing the own vehicle 1 to generate the deceleration of greater than or equal to the deceleration same as the leading vehicle 100 within a time in which the time corresponding to the initial relative velocity $V_{r0}$ is subtracted from the set inter-vehicle time τ.

The equivalent reaction time x is the time in which control to reduce the possibility of rear-end collision between the own vehicle 1 and the leading vehicle 100 by comparing with the set inter-vehicle time τ can be carried out, and thus it can be handled similar to the reaction time $t_{delay}$ of when the initial relative velocity $V_{r0}$ is not generated. In other words, even if the initial relative velocity $V_{r0}$ is generated, conversion can be made to the equivalent reaction time x so as to be handled as the equivalent reaction time $x = t_{delay}$, similar to when the initial relative velocity $V_{r0}$ is not generated, and the equivalent reaction time that satisfies $\{t_{delay}(\text{equivalent reaction time}) \leq \tau(\text{set inter-vehicle time})\}$ is derived to carry out the braking control capable of reducing the possibility of rear-end collision.

When decelerating the own vehicle 1 in accordance with the deceleration of the leading vehicle 100, the possibility of rear-end collision with the leading vehicle 100 can be reduced by deriving the deceleration of the own vehicle 1 that can satisfy each equation described above and decelerating the own vehicle 1 using the deceleration of the leading vehicle 100 and the inter-vehicle time. The control for reducing the possibility of rear-end collision with the leading vehicle 100 using the above conditions at the time of the deceleration of the leading vehicle 100 in the follow-up travel control will be specifically described for the communication follow-up travel control and the autonomous follow-up travel control. First, in the communication follow-up travel control, the travel information of the leading vehicle 100 is acquired by the inter-vehicle communication to carry out the follow-up travel control, and hence such information is also acquired when the leading vehicle 100 decelerates. For example, when the driver of the leading vehicle 100 performs the braking operation on the brake pedal to decelerate, the leading vehicle travel information acquiring unit 45 acquires the information of the braking operation. When carrying out driving assisting control of the driver such as carrying out the follow-up travel control on the vehicle in front, the leading vehicle 100 acquires, with the leading vehicle travel information acquiring unit 45, the information of the deceleration control of when decelerating the leading vehicle 100 by the driving assisting control.

The communication follow-up travel control ECU 40 that acquired the travel information at the time of the deceleration of the leading vehicle 100 using the inter-vehicle communication with the leading vehicle travel information acquiring unit 45 derives the maximum deceleration of the leading vehicle 100 with the leading vehicle maximum deceleration deriving unit 46 based on the information at the time of deceleration acquired by the leading vehicle travel information acquiring unit 45. When deriving the maximum deceleration of the leading vehicle 100 with the leading vehicle maximum deceleration deriving unit 46, for example, when using the information of the braking operation as the information at the time of deceleration of the leading vehicle 100, the deceleration generated by the braking operation of the driver is derived based on the operation amount and the operation speed when the driver operates the brake pedal, and the maximum deceleration of when the braking operation is carried out is also derived with the leading vehicle maximum deceleration deriving unit 46.

When using the information of the deceleration control of when decelerating the leading vehicle 100 by the driving assisting control as the information at the time of deceleration of the leading vehicle 100, the deceleration of the leading vehicle 100 is acquired based on the instruction of deceleration instructed by the driving assisting control, and furthermore, the maximum deceleration of when the deceleration instruction is made is derived with the leading vehicle maximum deceleration deriving unit 46. The leading vehicle maximum deceleration, which is the maximum deceleration of the leading vehicle 100 derived by the leading vehicle maximum deceleration deriving unit 46 of the communication follow-up travel control ECU 40, is transmitted to the travel control ECU 20, and the deceleration of the own vehicle 1 is calculated by the deceleration calculating unit 33 of the travel control ECU 20 based on the leading vehicle maximum deceleration.

When calculating the deceleration of the own vehicle 1 with the deceleration calculating unit 33, the deceleration is calculated based on the inter-vehicle time set based on the vehicle speed of the own vehicle 1 before the deceleration, and the displacement amount of deceleration, that is, the degree of change in deceleration with respect to the elapsed time is calculated such that the deceleration of the own vehicle 1 and the deceleration of the leading vehicle 100 are the same magnitude at the time point the inter-vehicle time has elapsed. When calculating the degree of change in deceleration, such degree in change is calculated as a value that can control the deceleration including the deceleration after the rise of the deceleration. Specifically, using the set inter-vehicle time τ set in advance for the communication follow-up travelling and the leading vehicle maximum deceleration $a_{1\_max}$, which is the maximum deceleration of the leading vehicle 100 derived by the leading vehicle maximum deceleration deriving unit 46, $(V_{r\_max} = \tau \cdot a_{1\_max})$, which is equation (2), is calculated by the deceleration relative velocity calculating unit 35 to calculate the maximum value $V_{r\_max}$ of the relative velocity. The value that can control the deceleration of the own vehicle 1 including after the rise of the deceleration is calculated. That is, the maximum value $V_{r\_max}$ of the relative velocity is a value that can realize the amount of change in deceleration necessary for having the deceleration in decelerating the own vehicle 1 to the deceleration of the same magnitude as the deceleration of the leading vehicle 100 at the time point the inter-vehicle time has elapsed from the current vehicle speed.

When carrying out the autonomous follow-up travel control, on the other hand, the autonomous follow-up travel control ECU 60 derives the deceleration of the leading vehicle 100 based on the inter-vehicle distance with the leading vehicle 100 acquired by the forward state acquiring unit 61. That is, the deceleration at the time of deceleration of the leading vehicle 100 is derived by the leading vehicle deceleration deriving unit 63 based on the degree of change in the inter-vehicle distance between the own vehicle 1 and the leading vehicle 100 acquired by the forward state acquiring unit 61.

Furthermore, in the leading vehicle deceleration deriving unit 63, the leading vehicle maximum deceleration, which is the maximum deceleration of the leading vehicle 100, is derived based on the degree of change in the derived deceleration and the vehicle speed of the leading vehicle 100, the travelling environment at the time, and the like. The leading vehicle maximum deceleration derived by the leading vehicle deceleration deriving unit 63 of the autonomous follow-up travel control ECU 60 is transmitted to the travel control ECU 20 as the travel information of the leading vehicle 100, and the deceleration of the own vehicle 1 is calculated by the deceleration calculating unit 33 of the travel control ECU 20 based on the leading vehicle maximum deceleration.

When calculating the deceleration of the own vehicle 1 in the deceleration calculating unit 33 at the time of the autonomous follow-up travel control, the deceleration is calculated based on the inter-vehicle time set based on the vehicle speed of the own vehicle 1 before the deceleration, similar to the time of the communication follow-up travel control. That is, using the set inter-vehicle time $\tau$ set in advance for the autonomous follow-up travelling and the leading vehicle maximum deceleration $a_{1\_max}$, which is the maximum deceleration of the leading vehicle 100 derived by the leading vehicle deceleration deriving unit 63, $(V_{r\_max} = \tau \cdot a_{1\_max})$, which is equation (2), is calculated by the deceleration relative velocity calculating unit 35 to calculate the maximum value $V_{r\_max}$ of the relative velocity. It is thus calculated the maximum value $V_{r\_max}$ of the relative velocity, which is the value that can control the deceleration of when decelerating the own vehicle 1 including after the rise of the deceleration, and that can realize the amount of change in deceleration necessary for realizing the deceleration of the same magnitude as the deceleration of the leading vehicle 100 at the time point the inter-vehicle time has elapsed from the current vehicle speed.

In the communication follow-up travel control, the deceleration and the timing to start the deceleration of the leading vehicle 100 can be more accurately recognized since the travel information of the leading vehicle 100 is acquired by the inter-vehicle communication, but in the autonomous follow-up travel control, the deceleration of the leading vehicle 100 is derived based on the inter-vehicle distance between the own vehicle 1 and the leading vehicle 100. The accuracy is thus lower in the deceleration of the leading vehicle 100 derived in the autonomous follow-up travel control than in the deceleration of the leading vehicle 100 derived in the communication follow-up travel control. Thus, in the autonomous follow-up travel control, the deceleration control of the own vehicle 1 most suited for the actual relative travel state of the leading vehicle 100 and the own vehicle 1 is difficult to carry out compared to the communication follow-up travel control, but the deceleration of the own vehicle is preferably calculated with the time point at which the inter-vehicle time has elapsed as the target as much as possible in the autonomous follow-up travel control, similar to the time of the communication follow-up travel control.

After deriving the deceleration of the own vehicle 1 based on the deceleration of the leading vehicle 100 in the communication follow-up travel control and the autonomous follow-up travel control, the brake control unit 22 controls the brake hydraulic pressure control device 8 according to the derived deceleration to cause the own vehicle 1 to generate the derived deceleration. In this case, in both cases of the communication follow-up travel control and the autonomous follow-up travel control, the relative velocity calculating unit 34 calculates the relative velocity $V_r$ with the leading vehicle 100 by the degree of change of the detection result in the radar 12, and the deceleration is controlled such that the relative velocity $V_r$ becomes smaller than or equal to the maximum value $V_{r\_max}$ of the relative velocity calculated by the deceleration relative velocity calculating unit 35. Thus, when actually adjusting the braking force and causing the own vehicle 1 to generate the deceleration, the control of the deceleration is carried out including the control after the rise of the deceleration, and the feedback control of the deceleration is carried out. The calculated deceleration is thereby appropriately generated by the own vehicle 1.

Figure 11:
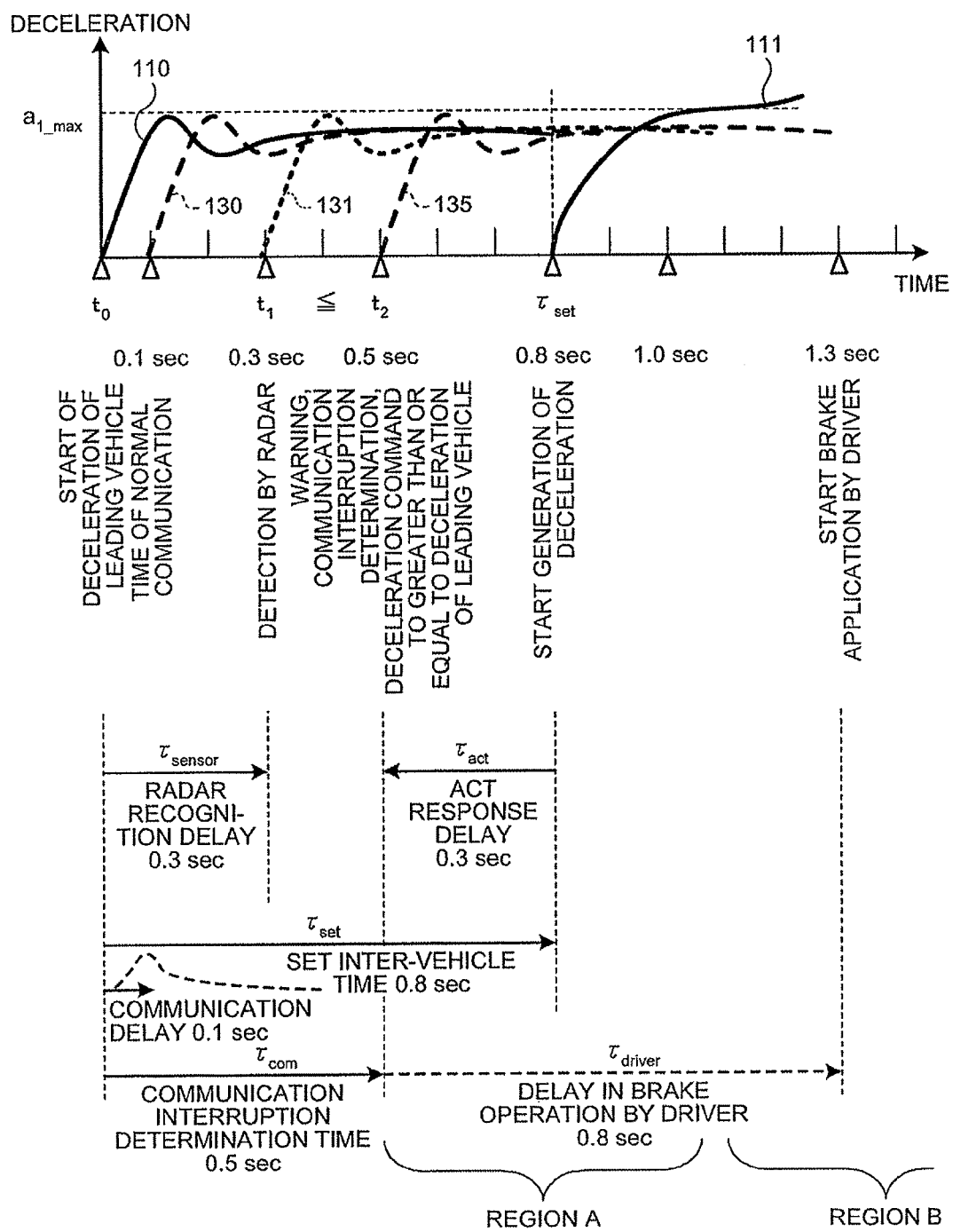
FIG. 11 is an explanatory diagram of control at the time of occurrence of communication interruption.

Although the control is performed while making the determination on the communication interruption during the communication follow-up travel control, the preparation for the brake control is started during the communication interruption before the determination on the communication interruption is made when the communication interruption starts to occur to more reliably reduce the possibility of rear-end collision with the leading vehicle 100 at the time of the communication interruption. FIG. 11 is an explanatory diagram of the control at the time of the occurrence of the communication interruption. For example, describing a case of carrying out the communication follow-up travel control at the inter-vehicle time of 0.8 s, when the inter-vehicle time is 0.8 s, if the deceleration of the same magnitude as the deceleration of the leading vehicle 100 can be generated by the own vehicle 1, the possibility of rear-end collision with the Leading vehicle 100 can be reduced by starting the deceleration of the own vehicle 1 within 0.8 s after the start of deceleration of the leading vehicle 100. That is, after the rise of the leading vehicle acceleration 110, the own vehicle acceleration 111 rises within 0.8 s, but the communication delay of about 0.1 s generates in the inter-vehicle communication used in the communication follow-up travel control. Thus, a communication detection leading vehicle acceleration 130, which is the leading vehicle acceleration 110 that can be detected with the own vehicle 1 by the inter-vehicle communication at the time of the communication follow-up travel control, is detected in the own vehicle 1 after 0.1 s of the leading vehicle acceleration 110.

The deceleration of the leading vehicle 100 can also be detected by the radar 12, and the deceleration of the leading vehicle 100 is detected by the radar 12 at the time of the communication follow-up travel control, but a radar recognition delay of about 0.3 s generates when detecting the deceleration of the leading vehicle 100 with the radar 12. Thus, a radar detection leading vehicle acceleration 131, which is the leading vehicle acceleration 110 that can be detected in the own vehicle 1 by the radar 12, is detected in the own vehicle 1 after 0.3 s of the leading vehicle acceleration 110.

When transmitting a control signal to the brake hydraulic pressure control device 8 to cause the actuator such as the wheel cylinder to actually generate the braking force, a response delay of about 0.3 s generates. Thus, when carrying out the control of deceleration such that the reaction time of the own vehicle 1 after the start of deceleration of the leading vehicle 100 becomes smaller than or equal to the set inter-vehicle time in which the inter-vehicle time is set between the own vehicle 1 and the leading vehicle 100, the deceleration instruction is to be made with an own vehicle request acceleration 135 for causing the own vehicle to generate the own vehicle acceleration 111 0.3 s before the set inter-vehicle time at the latest. Therefore, when the communication is interrupted after the leading vehicle travel information acquiring unit 45 acquires that the leading vehicle 100 started to decelerate at the time of the communication follow-up travel control, the determination on the interruption of the communication is waited until 0.3 s before the set inter-vehicle time, that is, 0.5 s after the start of deceleration of the leading vehicle 100.

Specifically, when the communication is interrupted after the start of deceleration of the leading vehicle 100, the deceleration control of the own vehicle 1 is carried out using the detection result of the radar 12 even after the communication is interrupted until elapse of 0.3 s in which the travel state of the leading vehicle 100 can be detected with the radar 12, and hence the recovery of the communication is waited until elapse of 0.3 s. The deceleration control of the own vehicle 1 cannot be carried out using the detection result of the radar 12 after elapse of 0.3 s after the start of deceleration of the leading vehicle 100, and hence the determination on the interruption of the communication is waited with the rise of hydraulic pressure to be generated by the brake hydraulic pressure control device 8 prepared.

If the communication does not recover before 0.5 s after the start of deceleration of the leading vehicle 100 in this state, the communication interruption determining unit 51 determines that the communication is interrupted, the control signal is transmitted from the brake control unit 22 to the brake hydraulic pressure control device 8 and the deceleration instruction is made with the own vehicle request acceleration 135. The own vehicle acceleration 111 thereby generates after elapse of the response delay of the actuator, that is, after 0.3 s. In other words, when the interruption time of the communication exceeds the communication interruption determining time when carrying out the inter-vehicle communication, the inter-vehicle communication is stopped, and the follow-up travel control is switched from the communication follow-up travel control to the autonomous follow-up travel control.

When the communication recovers before 0.5 s after the start of deceleration of the leading vehicle 100 with the rise of hydraulic pressure to be generated by the brake hydraulic pressure control device 8 prepared, the hydraulic pressure is set to zero to return to the normal communication follow-up travel control. That is, when the leading vehicle 100 starts to decelerate, and the communication interruption occurs while $t_1$, which is the time the leading vehicle 100 can be detected with the radar 12 after the radar recognition delay, and $t_2$, which is the time the deceleration instruction is made with the own vehicle request acceleration 135, do not satisfy the relationship ($t_1 \leq t_2$), the request to the brake actuator of before the determination on the interruption of the communication is started. In other words, when carrying out the communication follow-up travel control, it is a requirement that the relationship of the radar recognition delay $\tau_{sensor}$, which is the detection delay time until the own vehicle 1 detects the start of the deceleration control of the leading vehicle 100 based on the travel information from the starting time point $t_0$ of the deceleration control of the leading vehicle 100, the actuator response delay $\tau_{act}$, which is the control response delay time until the own vehicle 1 actually starts the deceleration control from the time point the own vehicle 1 transmits the deceleration control signal, and the set inter-vehicle time $\tau_{set}$, which is the inter-vehicle time of the leading vehicle 100 and the own vehicle 1, satisfy ($\tau_{sensor} + \tau_{act} \leq \tau_{set}$). If the radar recognition delay $\tau_{sensor}$, the actuator response delay $\tau_{act}$, and the set inter-vehicle time $\tau_{act}$ do not satisfy the requirement, the control at the time of the communication interruption is carried out.

The communication interruption determining time requirement is the communication interruption determining time $\tau_{com}$ at which the relationship of the communication interruption determining time $\tau_{com}$, the actuator response delay $\tau_{act}$, and the set inter-vehicle time $\tau_{set}$ becomes ($\tau_{com} + \tau_{act} \leq \tau_{set}$). Thus, the deceleration command is started the actuator response delay $\tau_{act}$ before the set inter-vehicle time $\tau_{set}$. That is, the determination of the communication interruption is tolerated until the actuator response delay $\tau_{act}$ before the set inter-vehicle time $\tau_{set}$.

It is a requirement that the set inter-vehicle time $\tau_{set}$ is greater than or equal to the time obtained by adding the communication interruption determining time $\tau_{com}$ and the actuator response delay $\tau_{act}$, but the set inter-vehicle time may change depending on the travel status of the own vehicle 1. Thus, if the set inter-vehicle time $\tau_{set}$ is a relatively long time, the determination of the communication interruption can be appropriately carried out even if the communication interruption determining time $\tau_{com}$ is relatively long, but the communication interruption determining time $\tau_{com}$ needs to be made short to carry out the appropriate follow-up travel control if the set inter-vehicle time $\tau_{set}$ is short.

Rewriting the relational expression of the communication interruption determining time $\tau_{com}$, the actuator response delay $\tau_{act}$, and the set inter-vehicle time $\tau_{set}$ to express the requirement of the communication interruption determining time $\tau_{com}$, ($\tau_{com} \leq \tau_{set} - \tau_{act}$) is obtained. The communication interruption determining time $\tau_{com}$ is set to be smaller than or equal to the time in which the actuator response delay $\tau_{act}$ is subtracted from the set inter-vehicle time $\tau_{set}$.

When carrying out the communication follow-up travel control, the communication interruption determining time $\tau_{com}$ used in the control of the inter-vehicle communication is changed according to the set inter-vehicle time $\tau_{set}$ of the leading vehicle 100 and the own vehicle 1, which is the parameter at the time of the follow-up travel control. Specifically, when the set inter-vehicle time $\tau_{set}$, which is the inter-vehicle time between the leading vehicle 100 and the own vehicle 1 used in the control, changes during the communication follow-up travel control, the communication interruption determining time $\tau_{com}$ is calculated by the set inter-vehicle time $\tau_{set}$ and the actuator response delay $\tau_{set}$ in the communication interruption determining time setting unit 50 of the communication follow-up travel control ECU 40. The communication interruption determining unit 51 determines that the communication is interrupted if the interruption time of the inter-vehicle communication is longer than the communication interruption determining time $\tau_{com}$ calculated by the communication interruption determining time setting unit 50.

The actuator response delay $\tau_{act}$ is a reaction time unique to each vehicle 1, and thus the actuator response delay $\tau_{act}$ becomes substantially a constant time. Thus, describing a case in which the actuator response delay $\tau_{act}$ is 0.3 s, for example, the communication interruption determining time $\tau_{com}$ becomes 0.3 s when the set inter-vehicle time $\tau_{set}$ is 0.6 s, and the communication interruption determining time $\tau_{com}$ becomes 0.4 s when the set inter-vehicle time $\tau_{set}$ is 0.7 s. Similarly below, the communication interruption determining time $\tau_{com}$ becomes 0.5 s, 0.6 s, and 0.7 s when the set inter-vehicle time $\tau_{set}$ is 0.8 s, 0.9 s, and 1.0 s.

The communication interruption determining time $\tau_{com}$ thus does not need to be reduced to determine the interruption of the communication in a strict sense by changing the communication interruption determining time $\tau_{com}$ according to the set inter-vehicle time $\tau_{set}$, whereby the frequency to switch to the autonomous follow-up travel control at the time of the communication follow-up travel control reduces.

The communication interruption determining time is thus changed according to the inter-vehicle time, where the communication interruption determining time referred to herein includes not only the time for determining the communication interruption of the inter-vehicle communication but also the time of continuing the signal reception waiting state in which the own vehicle 1 waits for the reception of the signal from outside. In other words, the communication interruption determining time includes the entire time in which the communication follow-up travel control continues to be continued as the control stat of the own vehicle 1 regardless of the presence or absence of the reception. Such communication interruption determining time is changed according to the parameter used in the follow-up travel control such as the inter-vehicle time, so that even if the reception cannot be detected during the communication follow-up travel control, the communication follow-up travel control is maintained as much as possible and the frequent switching of the control is suppressed.

When the communication interruption determination is made at the time of the deceleration of the leading vehicle 100 in the communication follow-up travel control, the interruption of the communication with the leading vehicle 100 is notified to the driver. For example, an alarm sound is issued at the time point the communication interruption determining time $\tau_{com}$ has elapsed to notify the driver that the communication is interrupted. The driver carries out the brake operation after elapse of a predetermined time from when the alarm is heard. That is, the brake operation is carried out after elapse of the driver brake operation delay $\tau_{driver}$ from the determination of the interruption of the communication by the reaction delay of the driver him/herself from when the driver hears the alarm.

Therefore, even if the communication is interrupted during the communication follow-up travel control, the deceleration of greater than or equal to the deceleration of the leading vehicle 100 is command started earlier by the actuator response delay $\tau_{act}$ from the set inter-vehicle time $\tau_{set}$ such that the equivalent reaction time $t_{delay}$ and the set inter-vehicle time $\tau$ satisfy the relationship of ($t_{delay} \leq \tau$) in the region a until the deceleration of the own vehicle 1 rises. In the region B after the rise of the deceleration of the own vehicle 1, the appropriate feedback control is carried out based on the detection result of the radar 12 even after the rise of the deceleration of the own vehicle 1 such that the relative velocity $V_r$, the set inter-vehicle time $\tau$, and the leading vehicle maximum deceleration $a_{1\_max}$ satisfy the relationship $(V_r \leq V_{r\_max} = \tau \cdot a_{1\_max})$.

When another vehicle cuts in between the leading vehicle 100 and the own vehicle 1 during the communication follow-up travel control or during the autonomous follow-up travel control, the inter-vehicle time between the relevant vehicle and the own vehicle becomes the inter-vehicle time different from the inter-vehicle time set in the communication follow-up travel control and the autonomous follow-up travel control. In this case, the radar 12 detects the vehicle and sets the inter-vehicle time based on the detection result.

That is, in both cases of during the communication follow-up travel control and the autonomous follow-up travel control, the state in front of the own vehicle 1 is detected by the radar 12 and the follow-up travel control is carried out while acquiring the detection result with the forward state acquiring unit 61 of the autonomous follow-up travel control ECU 60 during the follow-up travel control, but if an obstacle which relative velocity with the own vehicle is not very large appears at a position closer than the inter-vehicle distance of the leading vehicle 100 and the own vehicle 1 during the follow-up travel control, such obstacle is determined as another vehicle. In this case, such vehicle is determined as the leading vehicle 100, the inter-vehicle distance with the new leading vehicle 100 is acquired with the forward state acquiring unit 61 based on the detection result of the radar 12, and the inter-vehicle time is detected by the inter-vehicle time detecting unit 30 based on the inter-vehicle distance acquired by the forward state acquiring unit 61 and the current vehicle speed acquired by the vehicle speed acquiring unit 25.

If a new leading vehicle 100 appears when another vehicle cuts in front of the own vehicle 1 during the communication follow-up travel control or the autonomous follow-up travel control, the follow-up travel control is carried out based on the inter-vehicle time detected by the inter-vehicle time detecting unit 30. Thus, when the new leading vehicle 100 decelerates, the own vehicle 1 is caused to generate the deceleration of the same magnitude as the deceleration of the leading vehicle 100 before elapse of the inter-vehicle time detected by the inter-vehicle time detecting unit 30.

The above vehicle control device 2 can change the control of the inter-vehicle communication according to the parameter at the time of the follow-up travel control carried out based on the travel information of the leading vehicle 100 acquired by the inter-vehicle communication, and thus can change the control of the inter-vehicle communication according to the travel information of the leading vehicle 100 of when carrying out the follow-up travel control. Thus, when the degree of importance of the travel information of the leading vehicle 100 at the time of the follow-up travel control is not very high, for example, the determination on whether or not the acquiring status of the travel information by the inter-vehicle communication is satisfactory becomes lenient so that the follow-up travel control carried out using the inter-vehicle communication can be maintained even in a situation where the inter-vehicle communication is difficult. Therefore, the frequency of switching the mode of the travel control of the own vehicle 1 according to the state of control of the inter-vehicle communication can be reduced. As a result, the travel control of the own vehicle 1 carried out while acquiring the travel information of the leading vehicle 100 by the inter-vehicle communication can be more appropriately carried out.

When the inter-vehicle time of the leading vehicle 100 and the own vehicle 1 is used as the parameter at the time of the follow-up travel control, and the control of the inter-vehicle communication is to be changed, the communication interruption determining time is changed, and hence the communication interruption determining time of the inter-vehicle communication can be changed according to the inter-vehicle time. Thus, when the inter-vehicle time is set long, and the degree of importance of the travel information of the leading vehicle 100 is low, for example, the criterion for determining whether or not the inter-vehicle communication is interrupted may cause the determination that the communication is interrupted to be difficult to carry out by setting the communication interruption determining time long. Therefore, the follow-up travel control carried out using the inter-vehicle communication can be maintained even in a situation where the inter-vehicle communication is difficult, and the frequency of switching the mode of the travel control of the own vehicle 1 can be reduced. As a result, the travel control of the own vehicle 1 carried out while acquiring the travel information of the leading vehicle 100 by the inter-vehicle communication can be more appropriately carried out.

The communication interruption determining time is set to a time shorter than the control response delay time from the time point the deceleration control signal is transmitted until the deceleration control is actually started, that is, the time obtained by subtracting the actuator response delay $\tau_{act}$, which is the delay time of response with respect to the control signal at the time of the follow-up travel control from the set inter-vehicle time $\tau_{set}$, so that the determination on the communication interruption can be made in view of the response time of when actually activating the actuator. Therefore, the determination on whether or not the inter-vehicle communication can be carried out can be accurately made at the time of the follow-up travel control. As a result, the travel control of the own vehicle 1 carried out while acquiring the travel information of the leading vehicle 100 by the inter-vehicle communication can be more appropriately carried out.

If the interruption time of the communication exceeds the communication interruption determining time when carrying out the inter-vehicle communication, the inter-vehicle communication is stopped, and the follow-up travel control is switched from the communication follow-up travel control to the autonomous follow-up travel control, so that the control can be suppressed from not being carried out by the continuation of the control using the inter-vehicle communication when the inter-vehicle communication cannot be carried out. As a result, the travel control can be appropriately continued and carried out when carrying out the travel control of the own vehicle 1 carried out while acquiring the travel information of the leading vehicle 100 by the inter-vehicle communication.

In the vehicle control device 2 according to the embodiment, the communication control that is changed according to the parameter at the time of the follow-up travel control such as the inter-vehicle time is the communication interruption determining time of the inter-vehicle communication, but the communication control that is changed according to the parameter at the time of the follow-up travel control is not limited to the communication interruption determining time. For example, the switch between permitting and shielding of the inter-vehicle communication, the communication rate at the time of the communication, the control related to the inter-vehicle communication such as the interruption determination control, and the like are changed according to the parameter at the time of the follow-up travel control such as the inter-vehicle time.

The parameter at the time of the follow-up travel control that becomes a reference in changing the communication control may be other than the inter-vehicle time. For example, any type may be used as long as it is a parameter set by the driver, or the parameter used at the time of the follow-up travel control such as the control amount determined thereby, acquired information acquired by the sensor used at the time of the follow-up travel control, and the like. Thus, the communication control suited to the state of the follow-up travel control at each time point can be carried out by changing the communication control of the inter-vehicle communication according to the parameter used at the time of the follow-up travel control, so that the travel control of the own vehicle 1 can be more appropriately carried out.

Each numerical value in the vehicle control device 2 according to the embodiment described above indicates the vehicle control device 2 or an example at the time of the follow-up travel control, and thus each numerical value of the vehicle control device 2 or at the time of the follow-up travel control is not limited to the above.

In the vehicle control device 2 according to the embodiment described above, when the follow-up travel control to the leading vehicle 100 is being carried out, the control is carried out such that the deceleration of the own vehicle 1 at the time of the deceleration of the leading vehicle 100 becomes the deceleration of the same magnitude as the deceleration of the leading vehicle 100 before elapse of the inter-vehicle time, but the vehicle 1 may include another device to perform the deceleration control. In addition to the vehicle control device 2 according to the embodiment, for example, the vehicle 1 may include a pre-crash safety (PCS) device, which is a device for warning the driver or applying braking when about to rear-end collide with the leading vehicle 100 at the time of normal travelling. In this case, a PCSECU (not illustrated) is arranged as the PCS control unit for carrying out the PCS control apart from the communication follow-up travel control ECU 40 and the autonomous follow-up travel control ECU 60, and when the PCSECU determines to carry out the PCS control from the detection result of the radar 12, the brake hydraulic pressure control device 8 is controlled to cause the own vehicle 1 to generate deceleration. Thus, the possibility of rear-end collision with the leading vehicle 100 can be reduced as much as possible even at the time of PCS control.

That is, in the vehicle control device 2 according to the embodiment, the travel information of the leading vehicle 100 is actively acquired and the appropriate deceleration is carried out so that the deceleration of the own vehicle 1 does not become too big according to the deceleration of the leading vehicle 100. However, if there is a possibility of rear-end collision with the leading vehicle 100, the own vehicle 1 is decelerated to reduce such possibility in the PCS device. Thus, with the arrangement of the vehicle control device 2 according to the embodiment and the PCS device, different deceleration control can be carried out according to the status at the time of the travelling, and deceleration corresponding to the travel status can be more appropriately carried out. Furthermore, with the arrangement of the PCS device, the possibility of rear-end collision with the leading vehicle 100 can be reduced by the PCS device not only at the time of the follow-up travelling but also at the time of the normal raveling in which the follow-up travelling is not carried out.

The PCS control by the PCS device may be carried out with the follow-up travel control, or the deceleration control may be carried out by the vehicle control device 2 at the time of normal deceleration of the leading vehicle 100 in the follow-up travel control, and the deceleration control may be carried out by the PCS device when about to rear-end collide with the leading vehicle 100 due to the sudden deceleration of the leading vehicle 100. Therefore, the possibility of rear-end collision with the leading vehicle 100 in the follow-up travel control can be more reliably reduced.

INDUSTRIAL APPLICABILITY

Therefore, the vehicle control device according to the present invention is useful in a vehicle that performs the follow-up travel control to the leading vehicle, and is particularly suited when carrying out the inter-vehicle communication with the leading vehicle.

REFERENCE SIGNS LIST 1 vehicle (own vehicle)
2 vehicle control device
12 radar
15 inter-vehicle communication device
20 travel control ECU
22 brake control unit
28 travelling mode switching unit
30 inter-vehicle time detecting unit
22 deceleration calculating unit
34 relative velocity calculating unit
35 deceleration relative velocity calculating unit
40 communication follow-up travel control ECU
41 inter-vehicle distance setting unit
45 leading vehicle travel information acquiring unit 46 leading vehicle maximum deceleration deriving unit
50 communication interruption determining time setting unit
51 communication interruption determining unit
60 autonomous follow-up travel control ECU
61 forward state acquiring unit
62 inter-vehicle distance setting unit
63 leading vehicle deceleration deriving unit
100 leading vehicle

The invention claimed is:

1. A vehicle control device comprising:
an inter-vehicle communication device capable of communicating information with another vehicle;
a leading vehicle travel information acquiring unit configured to acquire travel information of the leading vehicle by inter-vehicle communication performed by the inter-vehicle communication device; and
a travel control unit configured to: (i) control a travel state of an own vehicle based on the acquired inter-vehicle communication information of the leading vehicle, (ii) carry out communication follow-up travel control which is travel control of carrying out travelling that follows the leading vehicle while communicating with another vehicle, (iii) carry out autonomous follow-up travel control which is travel control of carrying out travelling that autonomously follows the leading vehicle without communicating with another vehicle, and (iv) use the communication follow-up travel control preferentially by switching the communication follow-up travel control and the autonomous follow-up travel control,
wherein control of the inter-vehicle communication is changed according to an inter-vehicle time between the leading vehicle and the own vehicle by changing a communication interruption determining time which is a time shorter than a time obtained by subtracting a delay time of a response with respect to a control signal at the time of the vehicle control from the inter-vehicle time, and the communication interruption determining time is set to become longer as the inter-vehicle time becomes longer, thereby decreasing a frequency of switching between the communication follow-up travel control and the autonomous follow-up travel control, and
wherein when an interruption time of the communication exceeds the communication interruption determining time when carrying out the inter-vehicle communication, the travel control unit stops the inter-vehicle communication, and switches the travel state from the communication follow-up travel control to the autonomous follow-up travel control.

* * * * *